March 18, 1975 F. D. RICH, JR., ET AL Re. 28,367

BUILDING

Original Filed July 16, 1971 13 Sheets-Sheet 1

INVENTORS
FRANK D. RICH JR.
ALEXANDER D. McDONALD

BY Louis Altman
ATTY.

INVENTORS
FRANK D. RICH JR.
ALEXANDER D. McDONALD
BY Louis Altman
ATTY.

BUILDING
Original Filed July 16, 1971 13 Sheets-Sheet 3
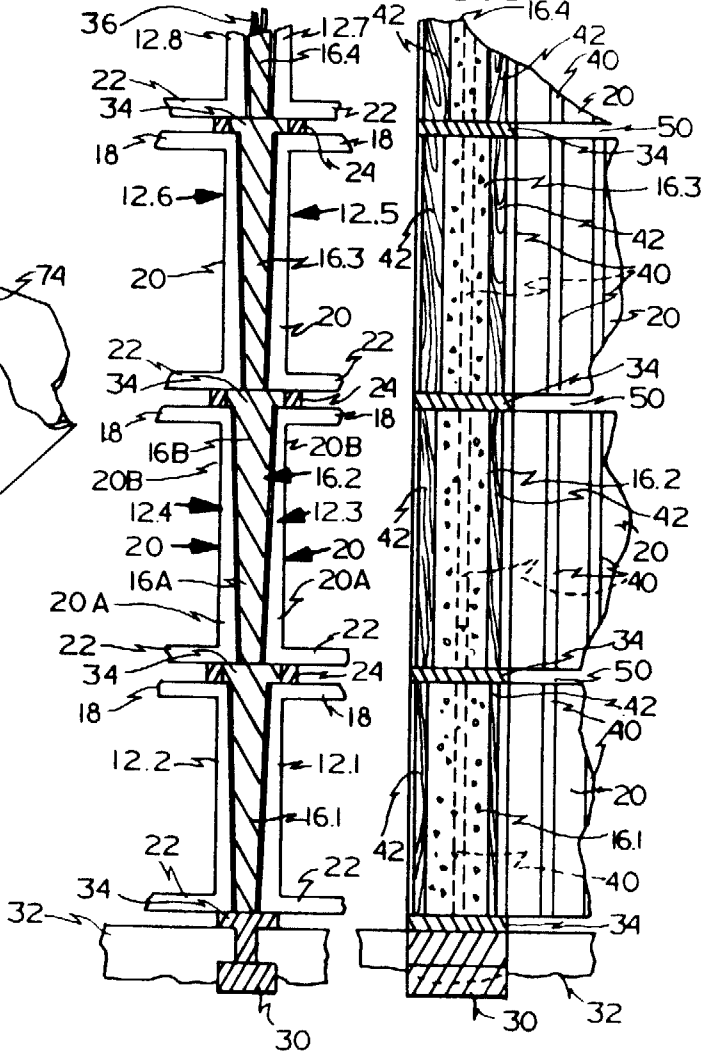
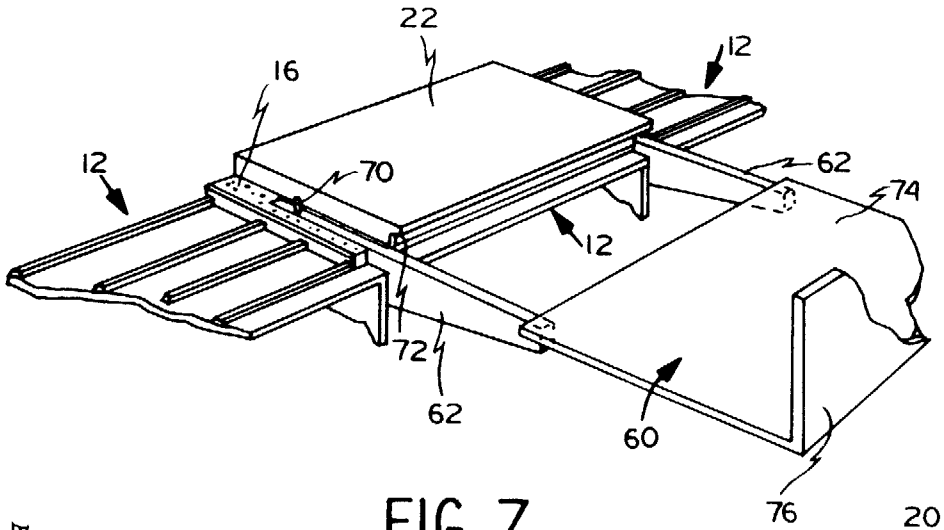
INVENTORS
FRANK D. RICH JR.
ALEXANDER D. McDONALD
BY Louis Altman
ATTY.

BUILDING

Original Filed July 16, 1971 13 Sheets-Sheet 4

INVENTORS
FRANK D. RICH JR.
ALEXANDER D. McDONALD
BY Louis Altman
ATTY.

BUILDING

Original Filed July 16, 1971 13 Sheets-Sheet 5

INVENTORS
FRANK D. RICH JR.
ALEXANDER D. McDONALD
BY Louis Altman
ATT'Y.

INVENTORS
FRANK D. RICH JR.
ALEXANDER D. McDONALD
BY Louis Altman
ATTY.

INVENTORS
FRANK D. RICH JR.
ALEXANDER D. McDONALD
BY Louis Altman
ATTY.

INVENTORS
FRANK D RICH JR
ALEXANDER D McDONALD
BY Louis Altman
ATTY.

INVENTORS
FRANK D. RICH JR.
ALEXANDER D. McDONALD
BY Louis Altman
ATTY.

INVENTORS
FRANK D. RICH JR.
ALEXANDER D. McDONALD
BY Louis Altman
ATTY.

INVENTORS
FRANK D. RICH JR.
ALEXANDER D McDONALD
BY Louis Altman
ATTY.

United States Patent

Re. 28,367
Reissued Mar. 18, 1975

28,367
BUILDING

Frank D. Rich, Jr., Darien, and Alexander D. McDonald, Stamford, Conn., assignors to F. D. Rich Housing Corporation, Stamford, Conn.

Original No. 3,750,366, dated Aug. 7, 1973, Ser. No. 163,274, July 16, 1971, which is a continuation-in-part of abandoned application Ser. No. 4,156, Jan. 19, 1970. Application for reissue June 6, 1974, Ser. No. 476,948
Int. Cl. E04h *1/12, 9/06*
U.S. Cl. 52—79 11 Claims

Matter enclosed in heavy brackets [ ] appears in the original patent but forms no part of this reissue specification; matter printed in italics indicates the additions made by reissue.

ABSTRACT OF THE DISCLOSURE

A building employing prefabricated room-enclosing modules which function also as box-shaped horizontal beams and ties for connecting vertical weight-supporting columns into a rigid framework. The columns are preferably concrete members which are poured in place into spaces formed between the modules. The inter-module spaces include vertical chases and horizontal plenums which are in communication with each other and with a heating/cooling plant output, to form an air jacket which surrounds each module over a plurality of its exterior surface, and operates as an effective radiant heat exchanger therewith. The heated or cooled air is ultimately discharged into the interior occupancy space of the modules, so as to provide a combination radiant and convective heating/cooling system. The interior occupancy space of the modules is sealed during on-site construction, so that no workmen may enter. The interior of the modules is finished prior to shipment to the construction site, including the installation of all interior service facilities and connecting lines leading from such facilities to a special chamber which is accessible from the exterior of the module. At the construction site workmen can enter this chamber to connect the modules to service risers which extend vertically through a duct formed by vertical alignment of the module chambers, and upper and lower hatchways thereof.

CROSS-REFERENCE

This application is a continuation-in-part of now abandoned U.S. patent application Ser. No. 4,156 filed Jan. 19, 1970 entitled "Improved Building."

FIELD OF THE INVENTION

This invention relates generally to construction, and is particularly applicable to high rise apartment buildings employing prefabricated room modules.

BACKGROUND OF THE INVENTION

There is a great deal of literature concerning the advantages of prefabricated room-enclosing boxes or modules, and other new techniques such as the use of poured-in-place or prefabricated and post-tensioned structural columns to support high rise buildings. It appears, however, that the modular box technique has not yet become standard practice in building construction, and therefore has not been developed to its fullest potential.

Since economics is the key to the adoption of any new construction technique, it appears that the savings presently obtainable by the use of prefabricated room modules are not sufficient. It may be, therefore, that it is necessary for these modules to combine a plurality of functions as a means of achieving still greater construction economies.

Certain problems in particular have been encountered in using prefabricated room modules in high rise buildings. The conventional approach to the construction of multi-story buildings by this method is to stack the modules one upon the other. This requires each module to have sufficient structural strength in the vertical direction to support the weight of all the modules above it. If the modules are identical, for ease of mass production, then they must either be so heavy (to meet the strength requirements of the lower stories) that material is wasted on the upper stories, or they must be so weak as to limit the maximum height of the building. If different types of modules are used for the upper and lower stories, on the other hand, then some of the advantages of mass production are sacrificed, and problems of inventory and storage are intensified.

In order to overcome these difficulties it is necessary to have separate vertical columns which support the weight of the modules on the upper floors. This can be accomplished by means of a conventional structural framework employing vertical columns connected together by horizontal beams and ties, but the erection of such a framework is costly and time-consuming. It has been previously suggested, as in French Pat. 1,244,983, that the modules can be made to do double duty by functioning as pouring forms, where the columns are made of concrete poured into the interstitial spaces between horizontally spaced modules. Moreover, if the entire space between such modules is not taken up by poured concrete the remaining space can be used for distribution of various service connections throughout the building. This approach is useful, but does not go far enough in extracting all possible economies from the box module concept; and in particular it still requires a complete structural framework. See, for example, U.S. Pat. No. 3,514,910 of Comm.

In construction projects generally, whether or not they employ the box module approach, a persistent problem has been dirtying of the interior room space when workmen enter to perform interior construction and/or finishing work, and to make service connections to on-site facilities such as electricity, water, waste disposal, and fuel. Unavoidably, mud and debris are tracked into the interior of the new building, necessitating a thorough cleaning operation before the building is ready to receive occupants. This is unavoidable if the interior rooms are constructed on the site; but even with the prefabricated room module approach, as it has been practiced until now, it is necessary to enter the modules to make service connections thereto.

It was recognized some time ago that superior heating and cooling of interior living space could be achieved by conducting heated and cooled air through spaces formed for that purpose in the walls, floors and ceilings. Not only is this expedient suggested in U.S. Pat. No. 2,107,523 of Coe; but it was used in primitive form by the ancient Romans who employed a "hypocaust" structure, i.e. an under-floor plenum and in-wall ducts, to heat their public baths. See "Hypocaust," Chambers' Encyclopaedia, 1959 Edition, vol. 7, p. 351–352 (published by George Newnes, Ltd., London) for a description of the Roman structure; and for a modern equivalent see "Plenum Floor System for Basementless Houses" by G. J. Stout, Better Building Report No. 4, College of Engineering, Pennsylvania State University, University Park, Pa. This approach heats or cools the interior room surfaces, so that the occupants are heated or cooled by radiation. In addition, the heated or cooled air may be conducted into the room interior so that convective heating/cooling effects are superimposed upon the radiative. The individual in-wall ducts suggested by Coe, Stout and the Roman architects to achieve this effect, however, are quite laboriously molded into the walls and/or incorporated into the floors by outmoded and uneconomical construction procedures.

THE INVENTION

The present invention goes much further in extracting construction economies from the room module approach. It contemplates that the room modules, in addition to enclosing interior space and functioning as molds for poured concrete columns, shall also function as the horizontal structural beams of the building framework. In order to perform this function, the modules are connected at opposite ends to the vertical columns, and have sufficient strength in the direction of their longitudinal axes to hold the columns in fixed relationship. In addition, the modules may also have sufficient structural strength in the direction of their transverse horizontal axes to serve as ties, which connect the vertical columns in a second horizontal direction.

In another aspect of the invention, during prefabrication the room modules are completely finished internally and provided with all necessary interior service facilities and connecting lines. Then the doors and windows of the modules are sealed so that no one will enter after the modules are delivered to the construction site. A special service connection chamber is provided, which is accessible from outside the module. All the service lines leading from the interior of the module terminate in this chamber, which the on-site workmen can enter to make connections without entering the living space. In order to form a vertical duct through which service risers can extend through the building, each of the chambers has upper and lower hatchways, and the chambers and hatchways of each vertical bank of modules are vertically aligned.

In this building, the spaces between horizontally adjacent and vertically adjacent modules contain heated or cooled air, resulting in an advantageous "hypocaust" type of radiative temperature conditioning system, and also providing convenient channels for conducting the conditioned air into the room interiors for convective as well as radiative heating or cooling. In this respect, the present building is similar to that seen in the Coe patent cited above. According to the present invention, however, the wall chases and the plenums between floors and ceilings which are required for this type of temperature conditioning system are inherently formed economically and easily by horizontal and vertical spacing apart of the pre-cast room modules as a result of the construction method described herein.

BRIEF DESCRIPTION OF THE DRAWINGS

FIG. 5 is a fragmentary vertical section of the building of FIG. 1, taken transversely of the modules, and showing the tapering of module walls and segments of columns which are poured in place between the walls of horizontally spaced modules.

FIG. 6 is a fragmentary vertical section of the same building, taken longitudinally of the modules, and showing decreases in the overall cross-sectional size of each successive column segment as the building progresses upwardly in height.

FIG. 7 is a fragmentary, partially exploded, perspective view, with parts broken away for clarity of illustration, of a pair of outrigger beams and an exterior gallery to be assembled therewith in the building of FIG. 1.

The same reference numerals designate the same elements throughout the several views of the drawing.

DETAILED DESCRIPTION OF THE PREFERRED EMBODIMENTS

Figures 1, 2:
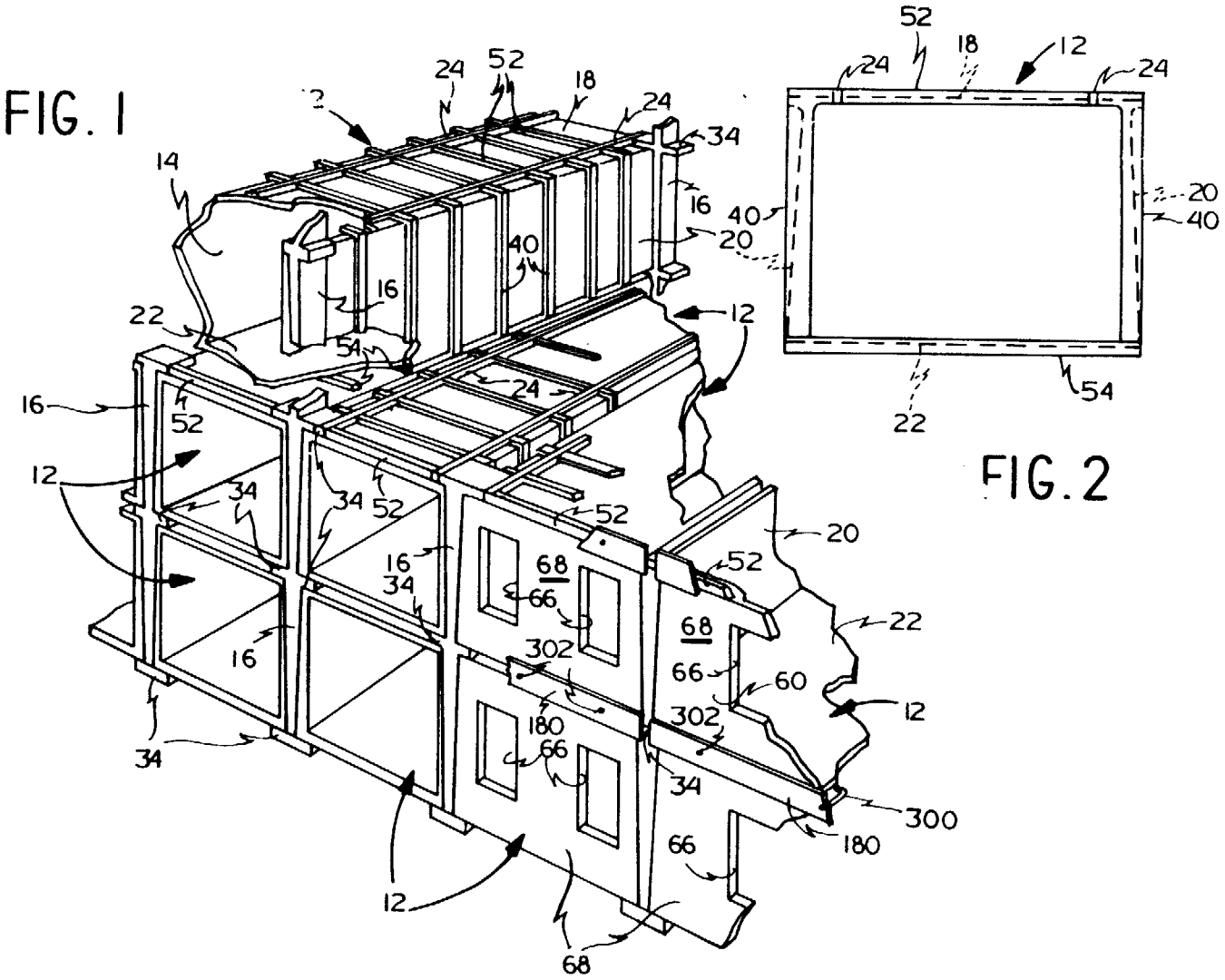
FIG. 1 is a perspective view, with parts broken away for clarity of illustration, of a partially constructed high rise apartment building in accordance with this invention.
FIG. 2 is an end elevational view of a single prefabricated module of the type used in constructing the building of FIG. 1.

A high rise apartment building in accordance with this invention comprises a plurality of individual prefabricated modules 12 arranged in a vertically and horizontally extending formation. These modules serve the basic purpose of enclosing interior room 14. In addition, however, they perform several other functions which are of great importance in deriving the maximum economic benefit from the modular concept; i.e. they constitute the horizontal beams extending across the width of the building (in the direction of the longitudinal axes of the modeules) which cooperate with upright supporting columns 16 to form a rigid rectanguar framework. Such columns and framework are required for a high rise building.

Such beams do not have the usual I-shaped beam cross-section employed in conventional building construction. The modules 12 are in effect large, hollow box-shaped beams, in which the "flanges" are a ceiling plate 18 and a floor plate 22; the "webs" are two wall plates 20; and the interior space surrounded by these four plates is the interior living area of the building. In order to develop sufficient longitudinal rigidity and ductility for the modules to function as beams, all four plates are preferably cast of concrete [grout material] *with sufficiently fine aggregate*, having conventional welded wire reinforcing mesh embedded therein.

In addition, the box beam modules 12 are connected to the vertical columns 16 at either end thereof, by any one of the variety of methods to be described below. Consequently, when the columns 16 at the opposite ends of a module 12 have any tendency to waver horizontally, their physical connection to the module, and the longitudinal restraint exerted by the latter, lock the columns and modules into a strong rectangular framework. Note also that the four plates 18, 20 and 22 are each stiffened by respective integrally cast concrete ribs 52, 40 and 54, which in turn are reinforced by steel rods embedded therein, as for example the rods 41 seen in FIG. 3.

In a preferred embodiment of the invention the box beam modules 12 serve a further function by defining forms in which the vertical columns 16 can be cast by pouring a suitable concrete material into the spaces between horizontally spaced modules. Once the concrete hardens, it forms strong structural members capable of supporting the weight of the upper modules 12. Thus the lower modules are spared the necessity for supporting the weight of the modules above them. Consequently, buildings constructed in accordance with this invention can attain as great a height as any other concrete-frame building, using mass-produced identical modules on each story.

In the process of construction of the illustrated building, first a plurality of poured concrete footings 30 (FIG. 5) are constructed in the ground 32, and a horizontally projecting haunch structure 34 is cast integrally therewith by means of conventional wood pouring forms above ground level. Next, the first level of prefabricated modules 12 is placed upon the haunches 34, which are designed to serve as support pads therefor. In FIG. 5 only one support pad 34 is shown for each module 12, but it will be appreciated that there are at least four such support pads for each module, appearing at the corners thereof. The first level of modules 12.1 and 12.2 are spaced apart laterally as seen in FIG. 5, i.e. in the directtion of the width of the modules, leaving a space therebetween into which a first level concrete column segment 16.1 can be poured. As a part of the pouring of segment 16.1, a next level haunch or support pad is formed at the top of column segment 16.1, by means discussed subsequently. Upon these haunches 34 are placed the second tier of modules 12.3 and 12.4, also in horizontally spaced relation to permit the pouring of a second level concrete column segment 16.2. The latter similarly is integrally cast with a third level set of haunches 34, upon which is erected still another tier of modules 12.5 and 12.6, and the next level poured concrete column segment 16.3. This process is continued through additional tiers of modules such as 12.7 and 12.8, and additional concrete column segments such as 16.4, until the desired number of stories has been erected.

It will be appreciated that the laterally projecting concrete haunch structures 34 are the members which each directly support the weight of the tier of modules 12 immediately above them, but the module weight load is transferred by the haunches 34 to the entire vertical length of column 16 therebelow. As is conventional in poured concrete construction processes, the individual column segments 16.1 through 16.4, etc. are reinforced by means of the usual steel rods 36 which are put in place before the pouring operation, and ultimately are embedded in the concrete. Usually a length of the rods 36 is allowed to project above each individually poured segment of the columns 16, and is subsequently embedded in the next column segment above, as a means of securing the segments together.

An additional feature of this invention results in a substantial strengthening of the molds, i.e. the module walls 20, without wasting any [grout material] *concrete*. When concrete is poured to a substantial depth, as is done here to form the column segments 16.1, 16.2, etc., the hydrostatic pressure exerted on the module walls 20 near the bottom of the mold is considerably greater than it is near the top of the mold. To resist that pressure, the module walls are made thick at the lower region 20A. But that thickness would be unnecessary, and wasteful of material, at the upper region 20B; thus the module walls are tapered upwardly as seen in FIG. 5. Consequently each individually poured concrete column segment 16.2, etc. is narrower at its lower region 16A than at its upper region 16B. This results in a complementary tapering of the module walls 20 and column segments 16.2, etc., which has advantages in securing the modules 12 and columns 16 together so that they function as a unified building framework. When the weight of the upper stories bears down on the columns 16, a certain amount of compression of the columns takes place. Consequently, the slanted surfaces of each column segment 16.2, etc. wedge downwardly against the complementary slant of the adjacent surfaces of the module walls 20, thus tending to bind the columns 16 and modules 12 together. Moreover, the effective column thickness for load-bearing purposes is that of the poured material 16.2 plus that of the two adjacent module walls 20 to which the poured material 16.2 adheres.

Figures 3, 4:
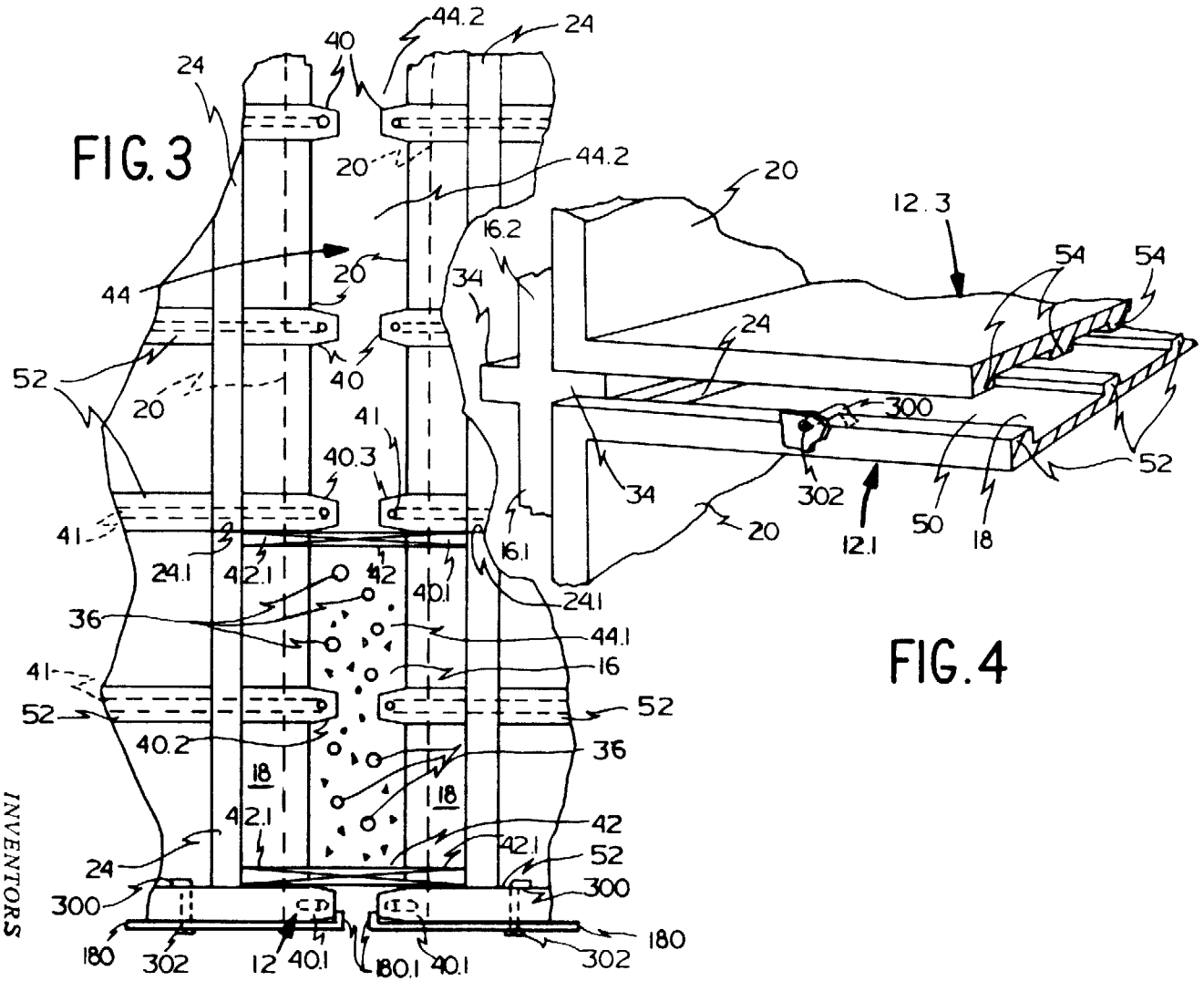
FIG. 3 is a fragmentary top plan view of the building of FIG. 1, showing the use of bulkheads to segregate a portion of the inter-module space for use as a concrete pouring form for the construction of columns.
FIG. 4 is a fragmentary perspective view showing laterally projecting haunches formed on the poured concrete columns, for the support of the modules immediately above, and the plenum spaces thus defined between modules spaced vertically by the haunches.

If the total height of the building requires the columns 16 to have maximum load-bearing capacity, the columns can extend along the entire horizontal length of the modules 12; i.e. they can occupy the entire length of the cavity between modules. However, a smaller column cross-section is adequate for an apartment building of ten stories, for example; and considerable concrete material can be saved if the columns 16 are confined to only a portion of the horizontal extent of their inter-module spaces. This is best accomplished, as illustrated in FIG. 3, by inserting expendable bulkheads 42, preferably inexpensive wooden planks, vertically into the space 44 between the side plates 20 of two horizontally spaced modules 12. A convenient way of bracing the wooden bulkhead planks 42 against the hydrostatic pressure of the poured concrete is by placing them against confronting pairs of vertical ribs 40.1 and 40.3. The entire inter-module space 44 is thus divided into regions 44.1 and 44.2. The first region 44.1 is the one into which the steel reinforcing rods 36 are inserted, and the material of the concrete columns 16 is poured. The remaining portion 44.2 of the inter-module space remains free of concrete, and thus constitutes a vertical chase which is useful as a vertical distribution conduit for centrally heated or cooled air, or air employed for ventilation.

As seen in FIG. 6, an additional saving of concrete can be achieved by decreasing the width of successive concrete column segments 16.1, 16.2, etc., as the building rises in height, reflecting the fact that each successively higher segment of the concrete columns 16 bears the weight of a smaller number of stories above it. The described decrease in column width on successive floors may be achieved, while using modules with identical rib spacing on each floor of the building, by selecting progressively thicker bulkhead planks 42 to restrict the concrete pour to smaller portions 44.1 of the inter-module spaces 44 as the building increases in height.

Figure 19:
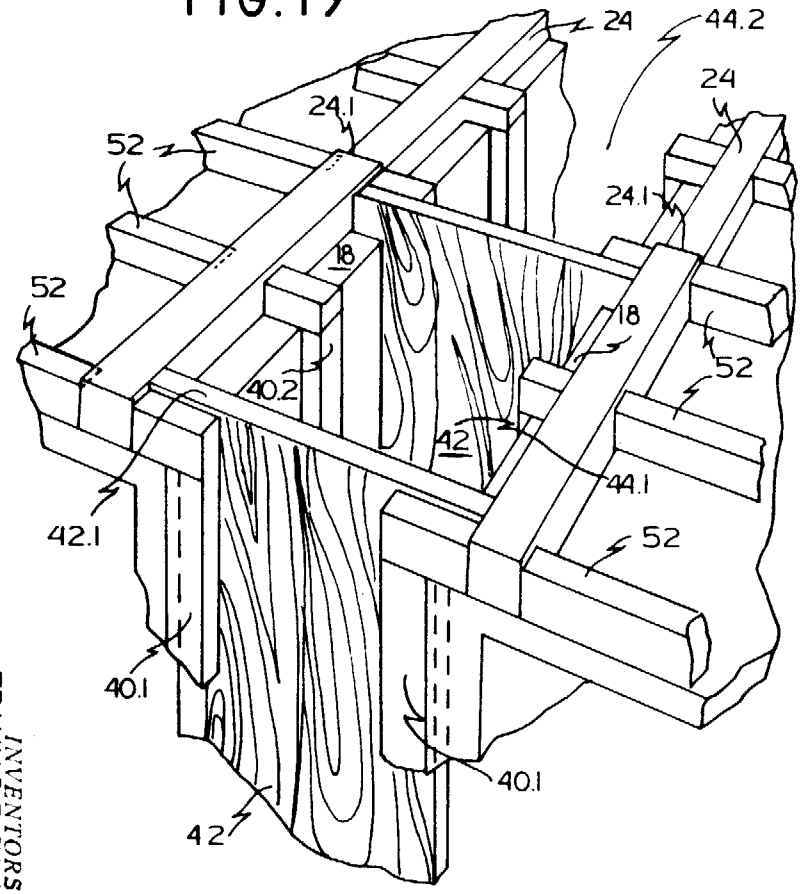
FIG. 19 is a perspective view of the T-shaped bulkhead tops which are used to form haunches at the top of each poured concrete column segment.

During the pouring of each column segment 16.1, 16.2, etc. the required haunch or support pad 34 is formed at the top of the segment within the space defined by the ceiling plates 18 of two adjacent modules such as 12.1 and 12.2 (FIG. 19), special extensions 24.1 formed on the screed ribs 24 of those modules, and T-shaped heads 42.1 to bridge between the screed ribs 24. The haunch pouring form thus defined is filled to a level [slightly] above the screed rib extensions 24.1 and bulkhead extensions 42.1 (stiff concrete material being used to prevent spillover) so that the haunch 34 becomes the furthest upward projecting, and therefore the weightbearing, member. *Preferably, the haunch 34 projects a minimum of two inches over the topmost member of the lower module. Alternatively, if screed ribs 24 and extensions 24.1 are not used, forms may be inserted between ribs 52 when the haunches are poured.*

The haunches so formed serve not only to support the prefabricated module immediately above, but also serve to space apart each pair of vertically consecutive modules to form a plenum space therebetween. Thus one of the laterally projecting haunches 34 spaces apart a lower level module 12.1 and an upper level module 12.3 immediately above it, so that between the [ceiling plate 18] *highest rib* of the lower module and the [floor plate 22] *lowest rib* of the upper module there is formed a horizontally extending plenum space 50 which is useful for the distribution of air for heating, air-conditioning or ventilating purposes to each of the apartments within the building.

Figure 8:
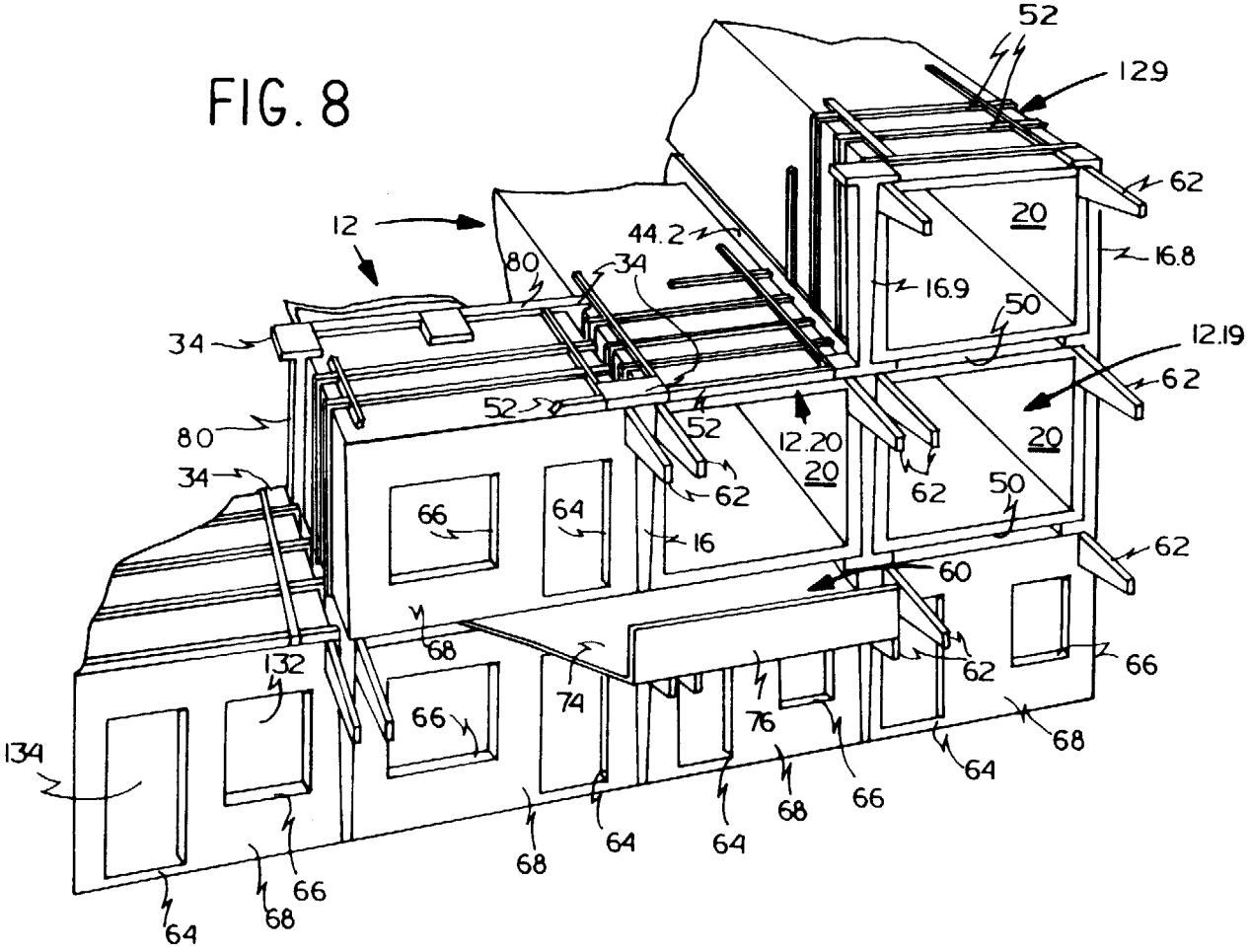
FIG. 8 is another fragmentary perspective view of an alternative building in accordance with this invention, illustrating the formation of outrigger beams as integral parts of the modules, and showing how these beams support exterior galleries which serve as a common hallway for the various apartment suites in the building.

Thus far we have pointed out a number of different functions which are all performed by the modules 12; i.e. they define various horizontal plenums 50 and vertical to be fabricated on the site, they serve as convenient pouring forms for the concrete columns, they form the horizontal structural beams for the building framework, they define various horizontal plenums 50 and vertical chases 44.2, and they ease the problems of designing a high rise building because they are not required to bear the load of all the modules above them. In addition, however, they also serve the further function of tying the columns 16 together in a direction parallel to the transverse horizontal axes of the modules. As seen in FIGS. 1, 4 and 8, each module ceiling plate 18 is formed with exterior stiffening ribs 52, while each module floor plate 22 is formed with exterior stiffening ribs 54. These ribs strengthen the module plates in a transverse direction so that they are able to serve as ties; i.e. structural members which connect the columns 16 in a transverse horizontal direction to complete the rigidity of the structural framework formed by the columns 16 and modules 12.

Thus, as seen in FIG. 8, a given module 12.9 ties together a pair of transversely spaced columns 16.8 and 16.9 to restrain them from moving independently of each other in the horizontal direction. In a conventional building framework the vertical load-bearing columns must not only be connected together in a first horizontal direction by a number of beams, but they must also be connected together in a second horizontal direction by a plurality of ties. The present invention permits a builder to dispense entirely with separate beam and tie members, and to rely only on the modules 12 to perform both functions. Consequently an elaborate cage of beams and ties is entirely replaced by a plurality of modules 12 whose presence is required for space enclosure purposes in any event.

The particular illustrative building embodiment described herein is an apartment house which has an exterior gallery at each floor serving as the common hallway providing access to individual apartment suites. The length of the building extends parallel to the transverse axes of the individual modules 12 and the exterior galleries 60 run along the length of the building, supported by horizontally projecting outrigger beams 62. As seen in FIG. 8, the exterior galleries provide access through main entrance doorways 64 to each apartment suite. These doorways, like the nearby windows 66, are formed in curtain walls 68 made of metal or any other suitable conventional construction material and constructed across the otherwise open end of each module 12 to form the side wall of the building. These curtain walls would normally be installed at the module factory.

FIG. 7 illustrates how the outrigger beams 62 may be separately cast of concrete, embedded in the poured concrete columns 16, and anchored therein by upwardly and downwardly projecting bolts 70, one of which is visible in FIG. 7. Alternatively, the outrigger beams may be formed integrally with the module side walls 20 as illustrated in FIG. 8. In either case the exterior gallery rests upon the outrigger beams, and fits horizontally into mating engagement with a kerf 72 (FIG. 7) formed at the front edge of the floor plate 22 of the module 12 immediately adjacent to each section of the gallery 60. The gallery itself is preferably formed of sections of pre-cast concrete [grout] including a floor plate 74 and a safety wall 76 formed integrally therewith.

Figure 16:
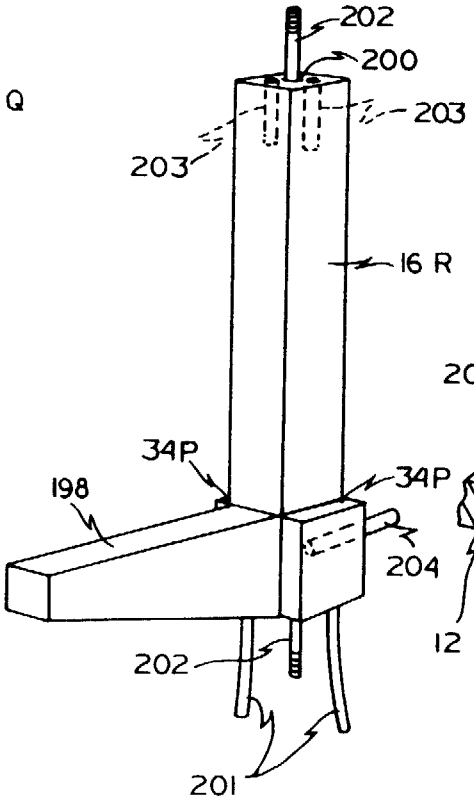
FIG. 16 is another perspective view of a similar column segment having an integrally cast outrigger beam for supporting the exterior gallery.

Another embodiment of the invention employs prefabricated concrete column segments 16P or 16Q (FIGS. 14 and 15) in place of the in situ poured concrete columns 16, or precast concrete column segments 16R (FIG. 16), which are formed with integrally cast outrigger beam extensions 198, in place of the in situ poured concrete beams 16 and the outrigger beams 62 of FIGS. 7 or 8. Such pre-cast beams are conventional in the construction industry, and are normally formed in one-story lengths or segments, which are then tied together into a complete column structure extending the full height of the building, by means of interlocking depending steel reinforcing rods 201 and upper sockets 203, and the well known post-tensioning technique. For the latter purpose the pre-cast column segments 16P, 16Q and 16R are provided with centrally located hollow liner tubes 200, through which pass post-tensioning bars 202 having threaded ends projecting from the top and bottom of the pre-cast segments. As each column segment 16P, 16Q or 16R is set in place, grout material is poured into the sockets 203 of the lower segment, and the depending rods 201 of the upper segment are inserted thereinto. Then the lower end of the post-tensioning bar 202 thereof is anchored by means of a threaded connection to the upper end of the post-tensioning bar 202 of the column segment immediately below, and then the upper end of the post-tensioning bar is pulled tight in an upward direction by means of a jack, and anchored to the top of the column segment by a wedge or any other known means.

In the present building, these pre-cast concrete column segments would have laterally projecting haunches or support pads 34P integrally formed at the bottom of each individual casting 16P, 16Q or 16R. Then, during the construction of the building, the column segments are the first portion of each building level or story to be put in place; i.e. the segments 16P, 16Q or 16R for a particular building level are first set in place upon the pre-cast column segments of the level below, after which the modules 12 for the new level are set in place upon the support pads 34P thereof, and the exterior galleries 60 for the new level are put in place upon the integrally cast outrigger beams 198.

The poured-in-place method has the advantage that it inherently joins the columns 16 to the modules 12 so that they are able to perform their function as box beams in the structural framework of the building. In connection with FIG. 5, we have already spoken of the downward wedging action resulting from the complementary slanting surfaces of the module walls 20 and poured concrete column segments 16.2 etc., an effect which can be obtained most easily with the poured-in-place method. In addition, however, each column segment such as 16.3 and its laterally projecting haunches 34, together with the laterally projecting haunches of the column segment 16.2 below it, form a C-shaped pincer formation which grasps the adjacent modules 12.5 and 12.6. Furthermore, the poured concrete material of the columns 16 and haunches 34 tends to adhere to the adjacent concrete [grout] of the module ceiling plate 18, side plate 20 and floor plate 22. As a result, there is a sufficiently strong connection between each module 12 and the columns 16 located at either end thereof, to connect them into a rigid structural framework in accordance with this invention. In addition, one or more of the vertical reinforcing ribs 40 of each module may be embedded in the poured concrete columns 16, as in the case of the reinforcing ribs 40.2 in FIG. 3, which interlocks the modules and columns to provide additional restraint against the possibility of independent movement.

Figure 13:
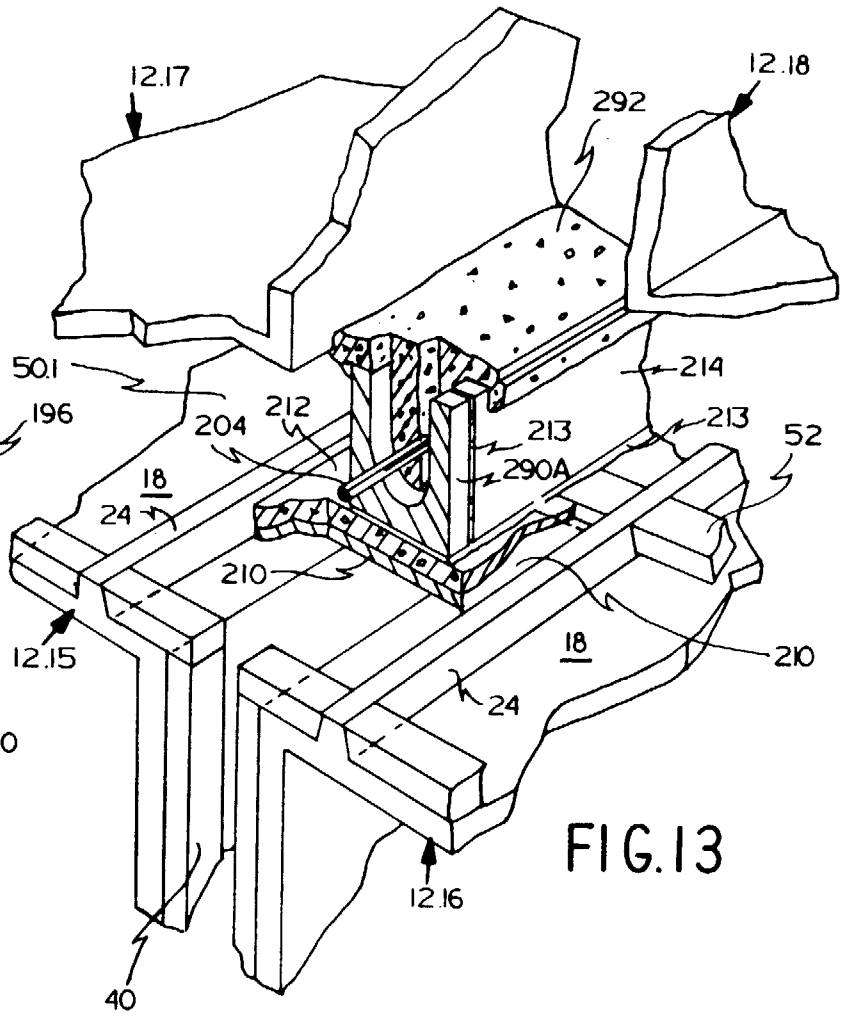
FIG. 13 is a fragmentary perspective view, with parts broken away for clarity of illustration, showing a partition for dividing the plenum space into separate chambers associated with individual apartment suites.
Figure 14:
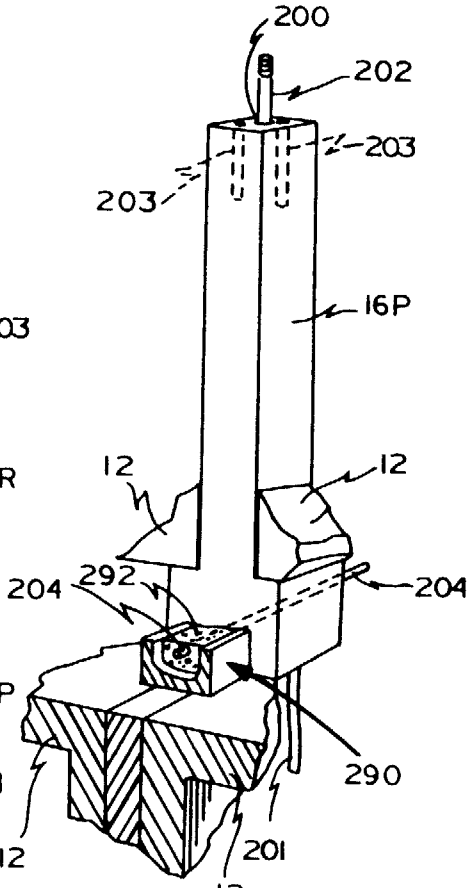
FIGS. 14 and 15 are perspective views of segments of an alternative form of columns for the buildings of the preceding figures, with means for post-tensioning.
Figure 15:
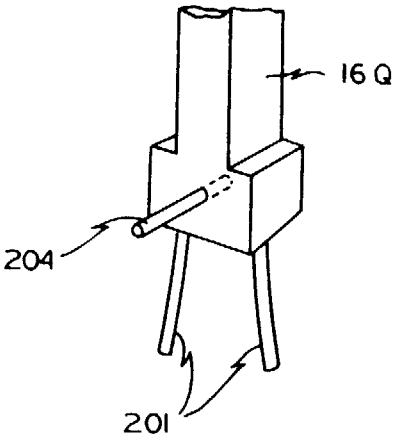

However, when pre-cast concrete column segments 16P, 16Q and 16R are used, it is not possible to achieve such adhesion, since the concrete column segments and the grout plates of the modules 12 can only come into contact with each other after all have dried and hardened. In addition, it is not possible to form the concrete column segments 16P, 16Q and 16R about any of the vertical stiffening ribs 40.2 as described above. Accordingly, in order to make a strong column-to-beam connection between the pre-cast column segments and the modules 12, the column segments 16P are provided with horizontally projecting tie rods 204 on opposite sides thereof, and the column segments 16R are each provided with a single such rod 204 on one side thereof (in the latter case opposite the integrally cast outrigger beam 198). As illustrated in FIG. 14, these tie rods are located so that each one of them extends into the hollow of a trough structure 290 projecting upwardly above the juncture of two adjacent modules 12 located adjacent to the particular column segment and placed on the floor below. This trough hollow is filled with mortar 292, and after the mortar is allowed to harden, the tie rods 204 are then rigidly connected to the respective modules 12 on the floor below. The opposite ends of the tie rods are embedded in the associated concrete column segment at the time of its casting, so that the modules 12 and column segments are rigidly tied together in accordance with the structural requirements stated above. The details of the trough structure 290 are discussed below in connection with FIG. 13.

The column segment 16R is intended for use on the outside wall of the building, where there are modules on one side only, and therefore no tie rods 204 are required on the opposite side. Instead, the individually cast outrigger beam 198 is required to support the exterior galleries 60. On the opposing outside wall of the building, where there are no exterior galleries, a different type of precast concrete column segment 16Q would be used, which has only two tie rods 204, and which lacks the outrigger beam 198.

Figure 9:
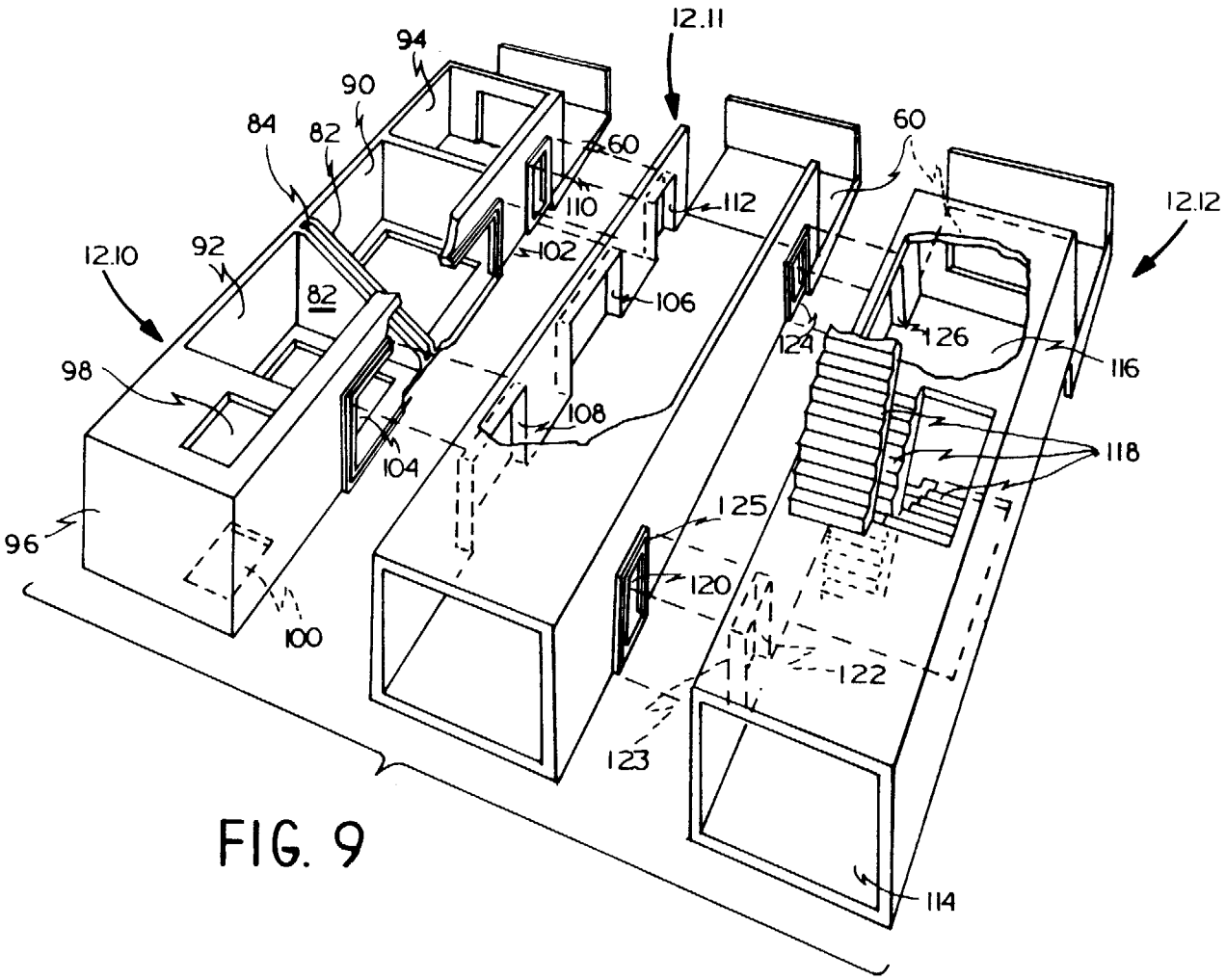
FIG. 9 is an exploded perspective view, with parts broken away for clarity of illustration, of three separate modules which cooperate with each other to provide the elevator, interior hall, and stairway facilities for the buildings of the preceding figures.

An additional feature of construction, of particular importance in zones where earthquakes are a consideration, is a concrete wall 80 (FIG. 8) which extends transversely across the mid-section of one or more modules. As seen in FIG. 9, such an earthquake wall may be formed by pouring liquid concrete between a pair of transverse module walls 82 defining a pouring cavity 84 between them. The resulting earthquake wall 80 is also formed with supporting pads or haunches 34 projecting laterally therefrom, for the purpose of supporting the module 12 immediately above, as in the case of the haunches formed on the column members 16.

At one or more points along the length of the apartment building, it is necessary to devote modules on each floor to elevator and stairway facilities, as well as a transverse hallway which provides an elevator waiting area, and preferably also connects with the stair landings. Thus as seen in FIG. 9, on each story of the building are three consecutive modules 12.10, 12.11 and 12.12 which perform these functions. Although shown in an exploded view, it will be understood that these three modules are installed in closely spaced relationship, and are designed to function as a unit. Moreover, each of the three modules illustrated in FIG. 9 has similar modules immediately above and below it in the adjoining stories, with which it cooperates.

Thus, module 12.10 is an elevator shaft module, and is divided into a pair of elevator shaft cubicles 90 and 92, assuming that the apartment building is designed for two elevators. The elevator shaft cubicles 90 and 92 are vertically aligned with similar cubicles in similar modules immediately above and below, thus defining elevator shafts extending vertically through the building. The module 12.10 also includes a superintendent's utility room 94 at one end, while at the other end it has a service chamber 96 which is formed with upper and lower hatches 98 and 100 respectively through which various service risers for electricity, plumbing, etc., may extend vertically through the building.

At the sides of elevator shaft cubicles 90 and 92 are formed elevator doorways 102 and 104 respectively, and these are horizontally aligned with elevator doorways 106 and 108 respectively formed in the side of the module 12.11. The entire interior of the latter module forms an interior hallway which is accessible from the exterior gallery 60, so that users of the building pass through it, and enter the elevators through doorways 106, 102 and 108, 104. In like manner the superintendent's utility closet 94 is formed with an entrance doorway 110 which lines up horizontally with an entrance doorway 112 in the module 12.11, for access from the interior hallway of the module 111.

Referene numeral 12.12 designates a stairway module having landing areas 114 and 116 at the opposite ends thereof, and two staircases 118 between the landings. The staircases 118 of each module 12.12 are in scissors relationship, and connect the landing area 114 of one module with the landing area 116 of another module. Stacking modules 12.12 in a vertical bank thus produces a continuous double stairway extending vertically through the building, just as stacking the elevator shaft modules 12.10 produces a pair of continuous elevator shafts. Doorways 120 and 122 are formed in the modules 12.11 and 12.12 to permit passage from the interior hall to the stair landing 114, while a similar pair of doorways 124 and 126 connects the hallways with stair landing 116.

Wherever two adjacent modules are required to have interconnecting doorways, as the cooperating modules do in FIG. 9, or as would be true of a relatively large apartment suite extends over more than one module, there must be a certain tolerance for both horizontal and vertical misalignment of confronting doorway openings, due to unavoidable errors in the placement of modules. Among several solutions to the horizontal misalignment problem, perhaps the simplest is to make the one of the doorways in which the door is installed (e.g. doorway 122 in FIG. 9) smaller in the horizontal direction than its cooperating doorway 120. If the size difference is made equal to twice the largest expected horizontal misalignment, then even in the event of a maximum horizontal offset in either direction, the smaller doorway 122 will not be displaced beyond the alignment field of the larger doorway 120. Thus functional alignment will always be possible, as long as tolerance limits are not exceeded. Of course the two different-sized doorways cannot meet precisely at both edges of the doorway, and may not meet at either edge, depending on the exact positioning of the modules; but this is an esthetic rather than a functional problem. For sealing purposes there are confronting hoods 123 and 125 entirely surrounding the cooperating doorways 120 and 122 respectively on all four sides, and these hoods project into close proximity with each other but do not touch. See FIGS. 9 and 20. Sealing contact is made by an elastomeric gasket 127 previously installed within a suitable recess formed in one of the confronting hood surfaces, for example hood 125.

The extent of vertical misalignment is expected to be fairly small; but nevertheless, in order to prevent tripping, and to cover over the small gap between hoods 123 and 125 at the bottom of the doorway, there is provided a walkover plate 250 (FIG. 20) which is bolted to a plurality of attachment clips 252. These clips grip a flange 251 at the lower edge of doorway hood 123. The clips 252 may be released or tightened against the flange by means of bolts 254, which also serve to fasten the plate 250 to the clips. When the bolts 254 are sufficiently loosened, the clips 252 are released so that the clips and the plate 250 can be advanced toward or retracted from the hood 125, by sliding horizontally over the lower edge flange 251. Initially these plates are in a retracted position so as not to interfere with placement of the modules. But after placement has been accomplished, the modules are entered for the purpose of advancing the walkover plates 250 into bridging position. Then they are finally secured in place.

Figure 20:
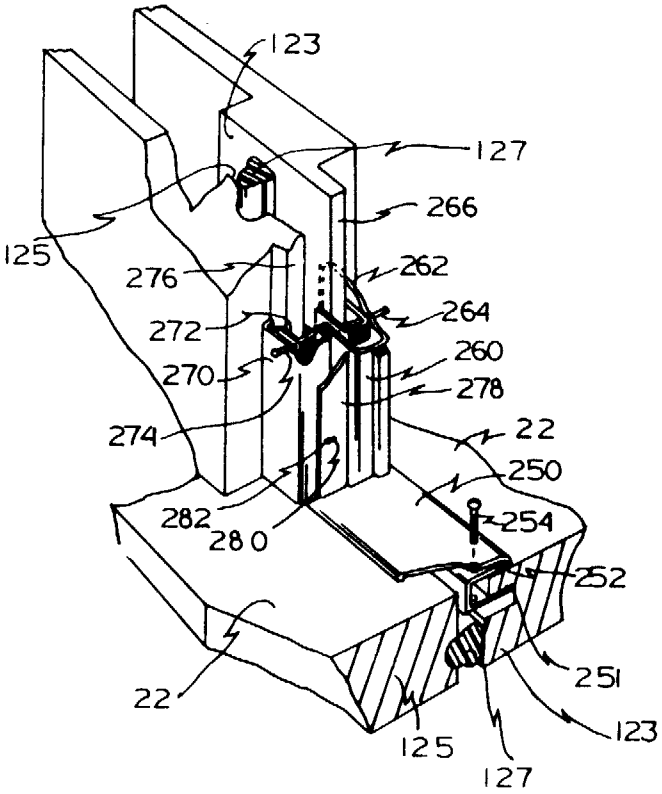
FIG. 20 is a perspective view of doorway hardware used with communicating rooms of different modules.

If the inevitable horizontal mismatch between different sized doorways is considered esthetically objectionable, the adjustable type of doorframe hardware illustrated in FIG. 20 may be employed to cover up. This includes a door buck 260 which is secured by clips 262 to flanges 260 formed on both sides of doorway hood 123. These clips are secured by bolts 264, which also serve to attach the buck 260 to the clips 262. In similar fashion, door jambs 270 are secured by clips 272 and bolts 274 to flanges 275 on both sides of the cooperating doorway hood 125. After releasing the bolts 274 sufficiently, the jambs 270 can be adjusted horizontally relative to the flanges 276 to line up the jambs with the adjacent section of the buck 260, and then the bolts 274 are tightened. A cover plate 278 is secured to each jamb 270 and is adjustable horizontally relative thereto by means of bolts 282 and elongated slots 280, to move into abutment with the adjacent section of the door buck 260. The adjustment of the jambs 270 and cover plates 278, like the adjustment of the walkover plate 250, is accomplished from inside the modules, after they have been set in place.

Figure 10:
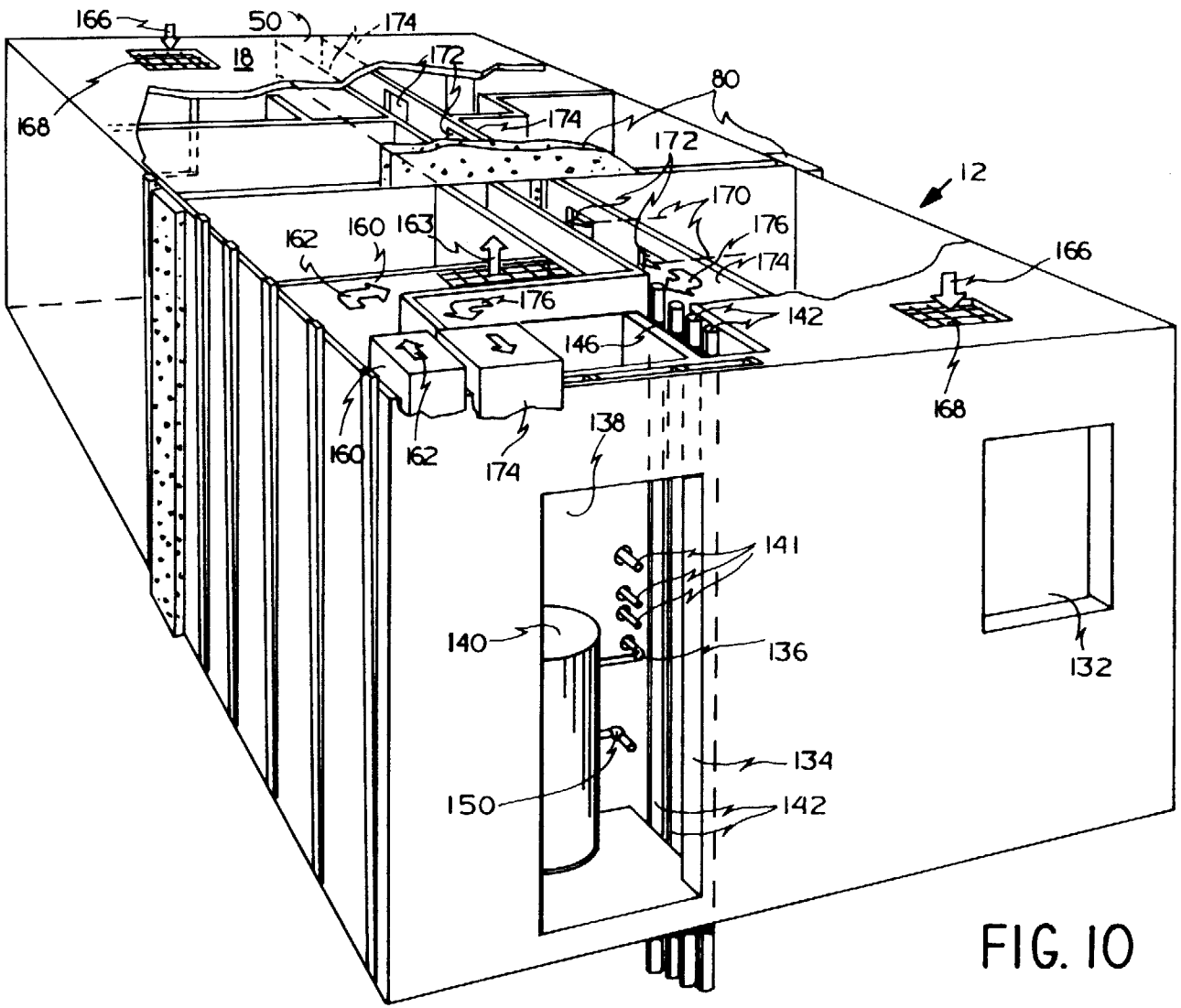
FIG. 10 is a perspective view, with parts broken away for clarity of illustration, showing the service connection chamber and other features of one of the modules in the building represented in the previous figures.

In accordance with an additional aspect of this invention, the curtain walls 68 are installed and the doorways 64 leading to the interior of each module are sealed at the factory where the module is manufactured, thus preventing workmen from entering the module interiors after delivery to the construction site. Another doorway 134, seen in FIGS. 10 and 12, leads into a special chamber 136 which is completely partitioned off from the remainder of the module 12; i.e. there is no access from the chamber 136 to those rooms of the module which are intended for human use or occupancy. Within the latter rooms are various service facilities such as electrical outlets, gas lines if a gas stove is installed, plumbing fixtures for the delivery of hot and cold running water and for waste disposal and suitable openings for the delivery of air for heating, air conditioning or ventilation purposes, and/or hot water radiators for heating purposes if that type of heating system is employed. From each of these facilities, factory-installed service lines 141 of the appropriate type, e.g. an electrical cable, a hot or cold water pipe, a waste disposal pipe, a vent line, a gas pipe, etc., lead through the interior of the module and ultimately reach the chamber 136 for connection to heating and/or air-conditioning unit 140 (if each suite has its own unit), and/or to service risers 142 within the chamber. The unit 140 can be a hot water heater which supplies hot water for washing as well as for space heating purposes if the latter type of heating system is employed, and/or a unit which provides heat for a hot air heating system and/or an air-conditioning unit which provides cold air during the summer months. The risers 142 would originarily include a cold water supply, waste drain, vent, electrical supply, and a gas or oil fuel supply, if required for the kitchen stove or heater 140. These service risers 142 are field-installed in the chamber 136, and can be connected to the heater/air-conditioner unit 140, as well as to all the service lines 141, by entering the chamber 136. Consequently, no workmen are required to enter the other rooms of the module 12.13 *except for intermodule connections at intermediate openings*. This has the advantage of keeping those rooms in factory-clean condition during the on-site phase of construction. The first person to enter the other rooms of the module 12 is the first occupant of the apartment suite; yet he finds complete electrical, plumbing, heating and air-conditioning facilities completely connected and in operating condition on his arrival.

If an apartment suite extends over more than one module, and if the hardware of FIG. 20 is employed at the inter-module doorways, then a final adjustment of the hardware from within the apartment suite would be required, as described above. But it will be appreciated that this adjustment is a simple screwdriver operation which can be done either by the occupant himself or by the superintendent as part of his normal post-construction rounds of the building. Thus the interior adjustment will not entail preoccupancy entrance into the module, and therefore will not result in dirtying the apartment before occupancy begins.

Each chamber 136 is formed with a floor hatch 144 and a ceiling hatch 146 which are in vertical alignment with each other and with the hatches 144 and 146 of the chambers of the modules above and below. As a result, the vertically aligned chambers 136 and their lower and upper hatchways 144 and 146 of a vertical bank of modules 12 all cooperate to form a duct, extending vertically through the apartment building, in which the service risers 142 may be installed during the on-site phase of building construction.

Figure 11:
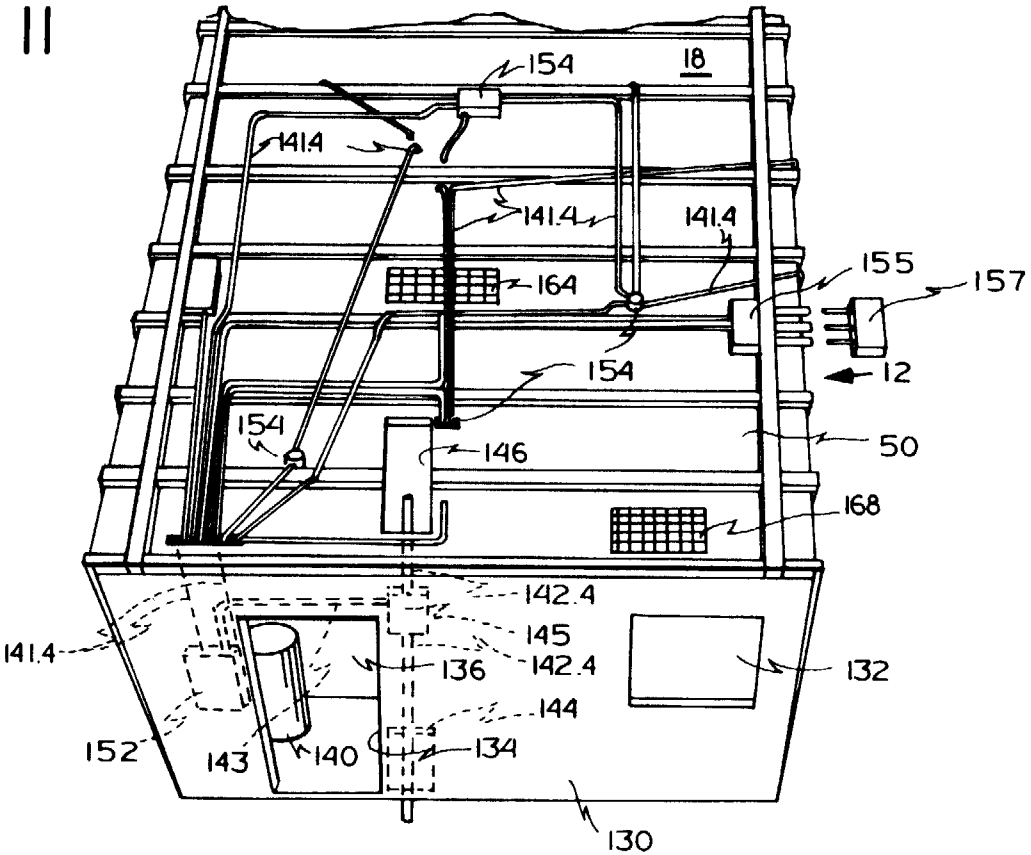
FIG. 11 is a perspective view of the module of FIG. 10, showing the distribution of electrical cables across the top of the module and extending back into the service connection chamber.

In FIG. 11 the details of the electrical distribution are shown. An electrical riser 142.4 extends upwardly through each duct defined by the vertically aligned chambers 136 and their lower and upper hatchways 144 and 146 respectively. At each floor a line 143 branches off from a junction box 145 and extends across the interior surface of the curtain wall 130, over the doorway 134, to a main electrical switch and circuit breaker panel 152 mounted on the inside of that wall. From there a plurality of electrical distribution lines 141.4 extend upwardly through the ceiling of the chamber 136 and across the roof of the module 12 to various junction boxes 154 which distribute electrical power to switches, outlets and electrical appliances throughout the rooms of the module 12.

The use of the plenum spaces 50 for electrical distribution in this manner has a number of advantages. Specifically, it avoids the need for erecting wooden forms on site to box off special spaces for electrical lines, since the plenums inherently provide the necessary space. This in turn makes it somewhat easier to coordinate trades, since there is now one less point of interdependency between carpenters and electricians.

For multi-bedroom apartment suites requiring more than one module 12, ordinarily only one of the modules of the suite would have the full service facilities of chamber 136, and that one would have to supply such services to the other module or modules in the suite. Thus, on the roof of the module depicted in FIG. 11 there is a female electrical jack 155 designed to mate with a male electrical plug 157 of an adjoining module (not shown), to distribute electrical power to the latter. Similar rooftop connections of plumbing and other lines can also be made; and these would not require the on-site workers to enter the modules, but only to walk across the module [rooves] *roofs*, which can easily be done for each module level before the next module level is put in place. Thus, interior cleanliness is preserved, even as to multi-module suites, wherein one or more modules have no service connection chamber of their own.

If the building is centrally heated, air-conditioned or ventilated, the vertical chases 44.2, i.e. the portions of the vertical spaces 44 between horizontally spaced modules which are not occupied by concrete, form excellent vertical air delivery channels which intersect with the horizontally extending plenum chambers 50 on each level.

Thus, as seen in FIG. 8, the vertical chase 44.2 between horizontally spaced modules 12.19 and 12.20 intersects with, and delivers air to, the horizontal plenum space 50 between the vertically spaced modules 12.19 and 12.9.

In a building having such a central temperature conditioning system, the vertical chases 44 and horizontal plenums 50 together [form] *permit intercommunication of a* volume of heated or cooled air which can be enclosed by the outer skin of the building (as described below), and which wholly or partially surrounds each of the individual room-enclosing modules 12. Consequently, the modules are provided with a jacket of heated or cooled air which is in heat exchange relationship with some or all of the external surfaces of the module panels. In the case of interior modules 12, the jacket of heated or cooled air in volume 44, 50 is in contact with all four panels; i.e. ceiling 18, walls 20 and floor 22; while in the case of modules located on the top or bottom floors or along the exterior walls, the air jacket makes contact on two or three sides only, unless special provisions are made.

Those module panels 18, 20 and/or 22 which are in contact with temperature conditioned air within a chase 44 or plenum 50 are heated or cooled thereby. In particular, the temperature conditioned air flows through the chases 44 and plenums 50, and in the course of its motion it scrubs across the external surfaces of the module panels 18, 20 and/or 22. As a result, the panel ribs 52, 40 and 54 respectively are interposed in the air flow path and cause turbulent eddies to occur adjacent the module surfaces, which promote heat exchange. Consequently the module panels 18, 20, 22 are efficiently heated or cooled by the air in volume 44, 50, and in turn warm or cool the occupants and contents of the modules 12 by radiation. The panels 18, 20, 22 are thin enough to serve as efficient radiation sources or absorbers for this purpose. After heating the module panels to produce the described radiative heating or cooling effect, the air in volume 44, 50 passes into and circulates through the module interiors, thereby causing additional heating or cooling by convection before returning to the central heating/cooling plant or escaping through an open window or door. (The conduits for leading air into and out of the module interiors in a centrally heated or cooled building are generally similar to those described below in connection with FIGS. 10 and 11.)

This "hypocaust" heating/cooling approach is applicable also to a building of this type wherein each zone, apartment suite, module or room has its own individual thermostat and heating or cooling plant. In that situation, however, one must partition the plenums and chases in a way which dedicates them to heating or cooling particular zones, modules, rooms or suites; and it is also necessary to insulate the floor panels of the upper story modules, so that each level of apartment suites is heated or cooled from the plenum above it, and the plenum below is thermally associated only with the next lower level of apartments. Thus, it is desirable to spray thermal insulation on the lower surfaces of the floor panels 22 of all upper story modules 12, so that each individual module is in effective heat exchange relationship with the ceiling plenum 50 above it, and not with the floor plenum 50 below it. Then each apartment level is heated or cooled by one of its adjacent plenums and has thermostatic control over that plenum, while the other adjacent plenum is dedicated to another apartment level. This prevents cross-talk between zones in which the thermostats may be set for different inside temperatures.

Insulating the floor panels 22 in this way is preferable to insulating the ceiling panels 18, for two reasons. First, in summertime, cooling is best accomplished from above, permitting the cooled interior air to sink through the room interior. Second, in wintertime, it is desirable for floors to be substantially cooler than body temperature in order to avoid foot circulation problems which can occur over long periods of apartment occupancy. (It follows that under-floor insulation might be desirable even in a building which does not require thermal isolation between apartment levels; e.g. in a centrally heated building.)

In order to distribute air provided by the individual apartment unit 140 for heating, ventilating or air conditioning purposes to all the rooms of the same module 12 and all other modules in the same apartment suite or thermostat zone, the air is first driven from the chamber 136 upwardly through a duct 160 (FIG. 10), as shown by arrows 162, and then is discharged upwardly as shown by arrows 163, through an opening 164 (FIG. 11) which leads into the plenum space 50 above the ceiling plate 18 of the module. From the plenum space 50 the air is distributed downwardly, as shown by arrows 166, through ceiling diffusers 168 to all the human use or occupancy rooms of the module 12. There it performs its convective heating, cooling or ventilating function, and is ultimately returned, as shown by arrows 170, through openings 172 leading into a return duct 174. The latter duct leads the return flow of air, as shown by arrows 176, across the module and downwardly into the chamber 136 again. Thus it will be appreciated that the specific features of construction of this building, with the modules 12 spaced apart by haunches or support pads 34 to provide plenum chambers 50 between the ceilings and floors of each vertical bank of modules, provide a useful air distribution system even for use in a building where each apartment suite or thermostat zone has its own local air heating, cooling or ventilating unit 140.

In such a building it would be necessary to isolate the portion of each plenum space 50 which is used for air distribution by one apartment suite, from the portion which is used by another suite. For example, as seen in FIG. 13, horizontally spaced modules 12.15 and 12.16 belong to different apartment suites on one floor, as do horizontally spaced modules 12.17 and 12.18 on the floor above. Thus, it is necessary to divide the plenum space 50 into mutually exclusive plenum chambers 50.1, for the use of module 12.15, and 50.2 for the use of module 12.16. For this purpose a thin, expendable pouring form, such as a piece of plywood 210, notched where necessary to accommodate vertical ribs 40, is placed on the upper surfaces of the ceiling plates 18 of modules 12.15 and 12.16, in position to bridge over the inter-module space 44. Then a layer of mortar is deposited over the member 210 to form a concrete sealing slab 212. Next, additional mortar 213 is applied and a row of concrete blocks 214 and, with pre-cast columns, U-shaped blocks 290A to form the trough structure 290 of FIG. 14, is placed along the length of the slab 212. Then the next module tier, including modules 12.17 and 12.18, is put in place, after which coarse mortar 292, too stiff to drain off through the small openings between the modules and the concrete blocks, is deposited in the trough blocks 290A and over the concrete blocks 214, and adheres to the blocks and the modules. Mortar 213 is also used between adjacent concrete blocks 214 and 290A to make a complete closure around each block. After all materials are dried and hardened, the slab 212, blocks 214 and 290A, and mortar 292 form the trough structure 290, and also form a continuous partition sealing off the plenum chamber 50.1 from the plenum chamber 50.2, so that the apartment suites including modules 12.15 and 12.16 can regulate their heating and cooling functions independently of each other.

As a less expensive but adequate alternative to the structure of FIG. 13, the horizontally adjacent plenum spaces 50.1 and 50.2 may be effectively partitioned from each other by placing a thick wad of crushable batt insulation on the surfaces of one or both lower modules 12.15 and 12.16. If it is desired to partition the horizontal plenums 50.1 and 50.2 from each other and also from the vertical chase between modules 12.15 and 12.16, the batt insulation would overlie both modules along their confronting edges, and be in bridging relationship across the vertical chase which separates them horizontally (just as structure 210, 212, 214 bridges that space in FIG. 13). Or if it is desired to partition horizontal plenums 50.1 and 50.2 from each other while leaving one of them in communication with the vertical chase between modules 12.15 and 12.16, then the batt insulation would be placed over one of these modules only, but close to the vertical chase between the modules. In either case, the wad of batt insulation is then crushed beneath one or both of the upper modules 12.17 and 12.18 when the latter are subsequently lowered into place over modules 12.15 and 12.16 respectively. When crushed between upper and lower modules in this fashion, the batt insulation is held firmly in place as a permanent part of the building, and the crushing contact insures an adequate air seal between horizontal plenums 50.1 and 50.2, as well as between one or both of these plenums and the vertical chases separating the lower modules 12.15 and 12.16, and between one or both plenums and the vertical chase separating the upper modules 12.17 and 12.18. If the batt partition bridges the intermodular chase, moreover, it constitutes a horizontal partition separating the upper and lower portions of the vertical chase from each other. Batt insulation is a good choice of materials for this purpose, because of its crushability and also because of its thermal insulation properties, the latter property being helpful in thermally isolating plenums and chases so that they are thermally dedicated to different apartment suites or different thermostat zones.

With any type of system, in order for the plenum spaces 50 to be useful for heating, cooling or air distribution purposes, they must be sealed off from the outside air along the end walls and side walls of the building. This sealing function is readily accomplished along the side walls of the building, i.e. at the ends of the modules 12, by field-installation of horizontal fascia panels 180 made, for example, of anodized aluminum (see FIGS. 1 and 3.). These panels are secured to the building by L-shaped bolts 300 terminating in screwdriver heads 302 which extend rotatably through the plates 180 and are accessible from outside the building. The plates are initially put in place with the L-shaped bolts 300 rotated to a horizontal position, so as to enter the space between the depending floor rib 54 of the module above and the upstanding roof rib 52 of the module below. Then the bolts 300 are turned by means of a screwdriver engaging the head 302 from outside the plate 180, to rotate the L-shaped end into hooking engagement behind the adjacent upper rib 54 or lower rib 52, and thereby retain the [place ] *plate* in place. Some conventional caulking compound may be used between the plate 186 and the adjacent surface of the building for better sealing of the plenum space 50. As best seen in FIG. 3, the ends of the fascia plates 180 are bent over to form fingers 180.1 hooked around the corners of the modules 12.

Figure 12:
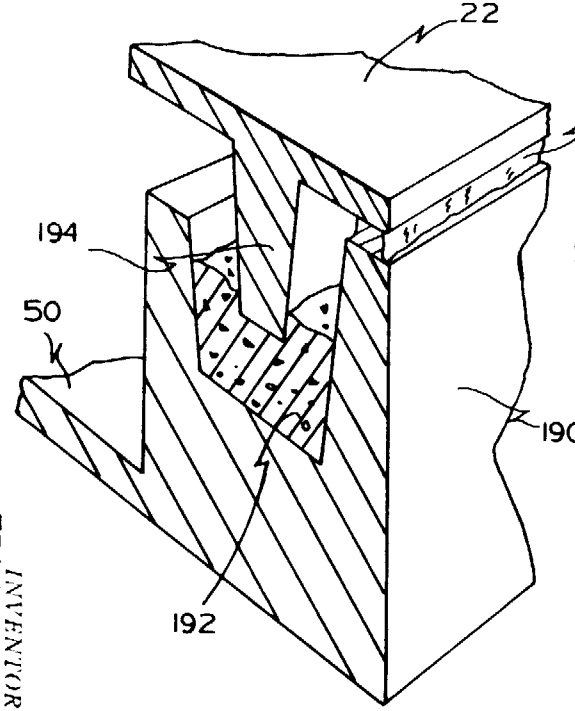
FIG. 12 is a fragmentary perspective view of one form of edge junction between upper and lower modules, designed to seal the edges of the plenum spaces formed between vertically spaced modules.

Alternative structure for accomplishing the same result, illustrated in FIG. 12, comprises an upstanding trough 190 located at the upper surface of the module ceiling plate 18, and running along the transverse edge thereof in place of the first ceiling rib 52. Into this trough structure, prior to the placement of the next level of modules above, there is poured mortar 192. Then the next story of the building is erected while the mortar 192 is still in a [fluid] *plastic* condition, and a cooperating tongue 194 which replaces the first floor rib 54 and depends from the lower surface of the floor plate 22 of the next module above, extends down into the hollow of the trough structure 190 and becomes embedded in the mortar 192. Thus, after hardening of the mortar a complete closure of the plenum space 50 is made along the transverse edges of the ceiling plate 18 and floor plate 22. As a precaution to prevent the entrance of moisture between the depending tongue 194 and the outer wall of the trough structure 190, the space between the trough and the floor plate 22 is filled with a flexible caulking compound 196 which is able to expand and contract with temperature changes.

Figures 17, 18:
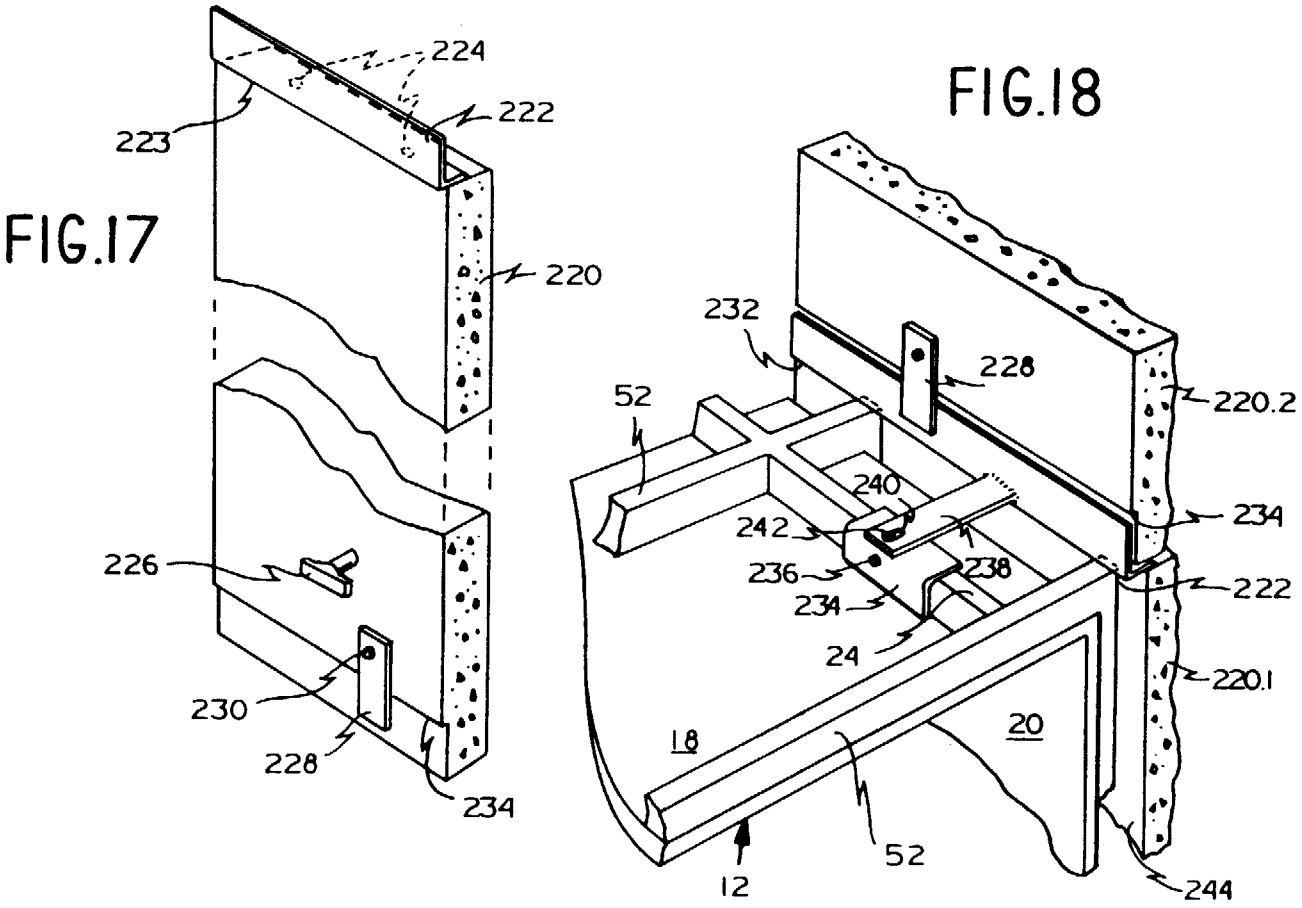
FIG. 17 is a perspective view of an exterior wall panel for use in constructing an end wall for the buildings of the preceding figures.
FIG. 18 is a perspective view of portions of a pair of such wall panels attached to the sides of the modules, and defining a space between the wall panels and the modules, into which concrete may be poured.

FIGS. 17 and 18 illustrate a method of sealing off the plenum spaces 50 longitudinally of the modules 12 along the end walls of the building, e.g. the wall of the building which appears at the right hand side of FIG. 8, which is composed of the external side walls 20 of the last vertical bank of modules 12.9, 12.19 etc. It is contemplated that a pre-cast concrete wall panel 220 shall be mounted externally of each module side plate 20 which forms an external wall of the building and that a plurality of such wall panels 220 shall cooperate for form a complete end facade for the buiding. Each individual panel has an angle bracket 222 which is secured to the upper edge thereof by bolts 224, a dovetail anchor 226 projecting inwardly from the panel, and a steel clip plate 228 which is secured to the panel by means of a bolt 230. In casting the concrete panel 220, the bolts 224, anchor 226 and bolt 230 are all embedded in the panel while it is still in a penetrable state, after which the concrete hardens to secure these elements in place. Note that the angle bracket 222 projects inwardly to overhang the inner surface of the concrete panel 220 along edge 232 of the bracket, and that a corresponding kerf 234 is formed at the lower edge of the panel, so that the lower end of the clip plate 228 is spaced inwardly from the panel.

As seen in FIG. 18, each of the pre-cast concrete panels 220 is secured in place relative to a particular module 12 on a particular level of the building, and attached to similar panels above and below. Thus panel 220.1 is placed adjacent to the side plate of a module 12, and is suspended therefrom by hanging the projecting lower edge 232 of the bracket 222 from the outer edges of the transverse reinforcing bars 52 which are formed on the upper surface of the module ceiling plate 18. For the purpose of securing the suspended panel in place, the longitudinal screed rib 24, which also is formed on the upper surface of the ceiling plate 18, is provided with an attachment bracket 234 secured thereto by a bolt 236. In addition, a connecting bar 238 is welded at one end to the inwardly facing surface of the top bracket 222, and has an elongated slot 240 through which passes a bolt 242 to secure the connecting bar 238 and panel 220.1 to the bracket 234. The elongation of the slot 240 provides a convenient adjustment for rotating the panel 220.1 into parallel relationship to the module side plate 20. Once this connection and parallel adjustment have been effected, the concrete material in liquid form is pored into the space 244 between panel 220.1 and the module side plate 20. The poured concrete hardens into an anchorage for the dovetail device 226 projecting into the space 244, thus forming a permanent end wall assembly and plenum seal. When the next level of modules is put in place, the next panel 220.2 is set immediately above the panel 220.1, with the upper angle bracket 222 of the lower panel fitting into the bottom kerf 234 and interlocking with the clip plate 228 of the upper panel to secure the two panels together.

In actual tests, a combination radiative/convective "hypocaust" cooling system of the type described has given good results. Because the temperature conditioned air flows through the living space, the system affords good ventilation and humidity control. The system also has good thermal inertia characteristics, compared to other types of inexpensively constructed convective systems in which the heating/cooling effect alternates between fully on and fully off. In the present system, on the other hand, the radiative effect operates even when the convective effect does not, i.e. while the heating/cooling plant is temporarily idled by the thermostat. This gives more even temperature regulation, and smooths out interior temperature fluctuations introduced either by cycling of the heating/cooling plant or by outside temperature changes. In other words, in this system the thermal inertia advantages of radiative heating are achieved without sacrificing the superior ventilation and humidity control characteristic of convective systems.

A prior art radiative/convective system is seen in the Coe patent cited above, which suggests sending heated or cooled air through in-wall ducts and floor-ceiling plenums, and then circulating it through the interior living space. But the Coe structure is inferior in two important respects. The present system achieves surface heating or cooling of the module walls 20 over broad, uninterrupted areas coextensive with the chases 44, instead of only local heating or cooling in the area of partitioned or restricted ducts formed at specific locations in the walls of Coe. Moreover the restricted wall ducts of Coe lower the air flow rate, and are too smooth-bored to introduce the desired turbulence which promotes heat exchange. But even more important, the wall ducts of the Coe building have to be specially constructed by the use of molding forms, whereas the present invention inherently develops the necessary air jacket volume 44, 50 merely through the spacing of the pre-cast modules 12 during the construction process described above. No special duct molding is required. In short, the present invention provides a more economically feasible "hypocaust" system than any known to the prior art.

The extent of the radiative effect achieved by the broad heated or cooled wall areas of present system is substantially greater than any achieved by the incidental radiation originating from or absorbed by the relatively narrow in-wall pipes or ductwork in an ordinary conventional convective system, and even compares favorably with the radiative/convective heating balance achievable with a partitioned or restricted wall duct structure such as Coe's. This is supported by reference to the nomographs of FIGS. 21 and 22 which provide quantitative analyses of the heating and cooling performance respectively of a system in accordance with this invention.

Figure 21:
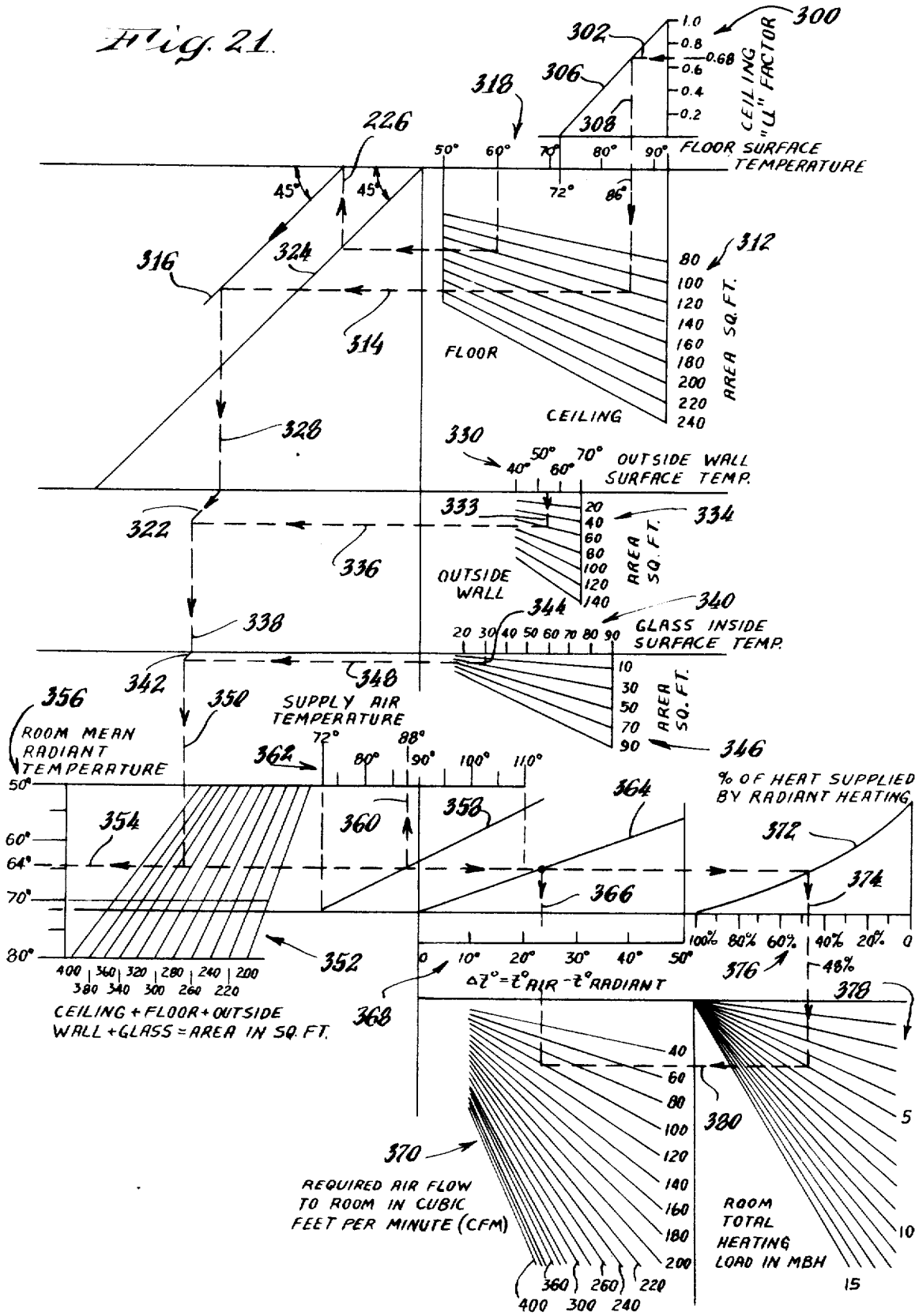
FIG. 21 is a nomograph quantitatively analyzing the heating performance of a hypocaust type radiant-convective temperature conditioning system in accordance with this invention.

With reference to FIG. 21, imagine for example that a particular apartment within a building in accordance with this invention has its own individual thermostat and heating plant; and that the heating plant supplies hot air at a temperature of 100° F. Suppose also that on a particular winter day, when the outside temperature is 0° F., the thermostat is set for an inside temperature of 72° F. Suppose, in addition, that the total heating load of the apartment is five MBH (one MBH equals 1000 BTU per hour), the total floor area is 120 sq. ft., the total ceiling area is also 120 sq. ft., the total outside wall area is 60 sq. ft. (for the sake of simplification, this analysis neglects interior walls), the total window area is 30 sq. ft., and the heat transmissivity ("u" factor) of the ceiling panels 18 is 0.68. This latter quantity is marked on a ceiling u factor scale 300 by a line 302. Tracing line 302 in the direction of the arrowhead, it is reflected by a slanted line 306 and redirected along line 308 to intercept a floor/ceiling area diagram 312. If the total ceiling area of the apartment is 120 sq. ft., line 308 is reflected from the appropriate line of graph 312 and redirected along line 314 to intercept 45° diagonal line 316.

The location of line 316 is determined by selecting a desired floor temperature. In a practical embodiment, sufficient insulating material would be adhered to the lower surface of floor panels 22 so that the temperature of the upper surface of the floor panels would be, for example, 60° F. (it is considered important that the floor temperature be substantially below body temperature in order to prevent the foot discomfort referred to above). Therefore the 60° temperature is marked on a floor surface temperature scale 318 by a line 320. The latter line then reflects from the appropriate floor area line of diagram 312, which in this specific example is 120 sq. ft. Line 320 is reflected as line 322, which in turn reflects from a 45° diagonal line 324 to produce line 326. The intersection of line 326 with the base line of the floor surface temperature scale 318 then determines the starting point for diagonal line 316.

From the intersection of lines 314 and 316 a vertical line 328 is drawn to intersect the base line of an outside wall surface temperature scale 330. From that intersection a slanted line 332 is drawn. Then the outside wall surface temperature at the exterior surface of the building is measured. Assuming this to be 55° F., that temperature is marked on scale 330 by a line 333 and traced across an outside wall area diagram 334. If the outside wall area is, for example, 60 sq. ft., then line 333 is reflected from the appropriate area line as line 336, which is traced to its intersection with line 332.

From the intersection of lines 332 and 336 there is drawn a vertical line 338 which intersects the base line of a glass inside surface temperature scale 340. From the point of intersection, line 338 is reflected along a slanted line 342. Then assuming that the glass inside surface temperature is 30° F., that temperature is marked on scale 340 by a line 344 and traced to its intersection with the appropriate area line of a glass surface area diagram 346. If the glass surface area is 30 sq. ft., line 344 is reflected along line 348 to its intersection with line 342.

From the point of that intersection, a vertical line 350 is drawn to its intersection with one of the lines of an area graph 352. This graph represents the total surface area of the ceiling, floor, outside wall and glass area of the apartment in question. If that total area is 330 sq. ft., line 350 is reflected along the line 354 to indicate a room mean radiant temperature of 64° on a temperature scale 356. This means that the room mean radiant temperature achieved by the radiative aspect of this heating system is 64° F., or 8° F. too low for optimum comfort, and that the balance of the heating effect must be supplied convectively.

In order to analyze the requirement for supplemental convective heating, line 354 is continued in the opposite direction to its intersection with slanted line 358. A vertical line 360 is then drawn from the intersection of lines 354 and 358, and read against a temperature scale 362 to indicate that the supply air must enter the interior living space at a temperature of 88° F. in order to achieve the necessary supplemental convective heating.

If line 354 is extended still further to its intersec- with a slanted line 364. From that intersection a vertical line 366 is dropped and read against a temperature scale 368 to indicate that the difference between the 88° supply air temperature entering the interior living space, and the room mean radiant temperature of 64°, is 24° F.

Then the vertical line 366 is traced further to its intersection with the appropriate line of an air flow rate diagram 370 marked in cubic feet per minute of air delivery into the interior living space. This diagram indicates that for the conditions previously stated and a supply air temperature to the room of 88° F., an air flow rate of 100 c.f.m. is required to supply the supplemental convective heating.

If the line 354 is extended still further to its intersection with a graph 372, and a vertical line 374 is dropped from the intersection of lines 354 and 372, it may be read against a percentage scale 376 to indicate that 48% of the heating, under the conditions stated above, is supplied radiantly. The balance, 52% of the heating, is supplied convectively.

The vertical line 374 can also be traced down further to a heating load diagram 378 which is calibrated in thousands of BTU per hour (MBH). Since the apartment heating load is five MBH, the intersection of vertical line 374 with the five MBH line of diagram 378 gives rise to a horizontal line 380 which then can be used, as an alternative to line 366, to lead into the air flow diagram 370. Note that line 380 confirms that under the conditions stated the required air flow is 100 cubic feet per minute.

Figure 22:
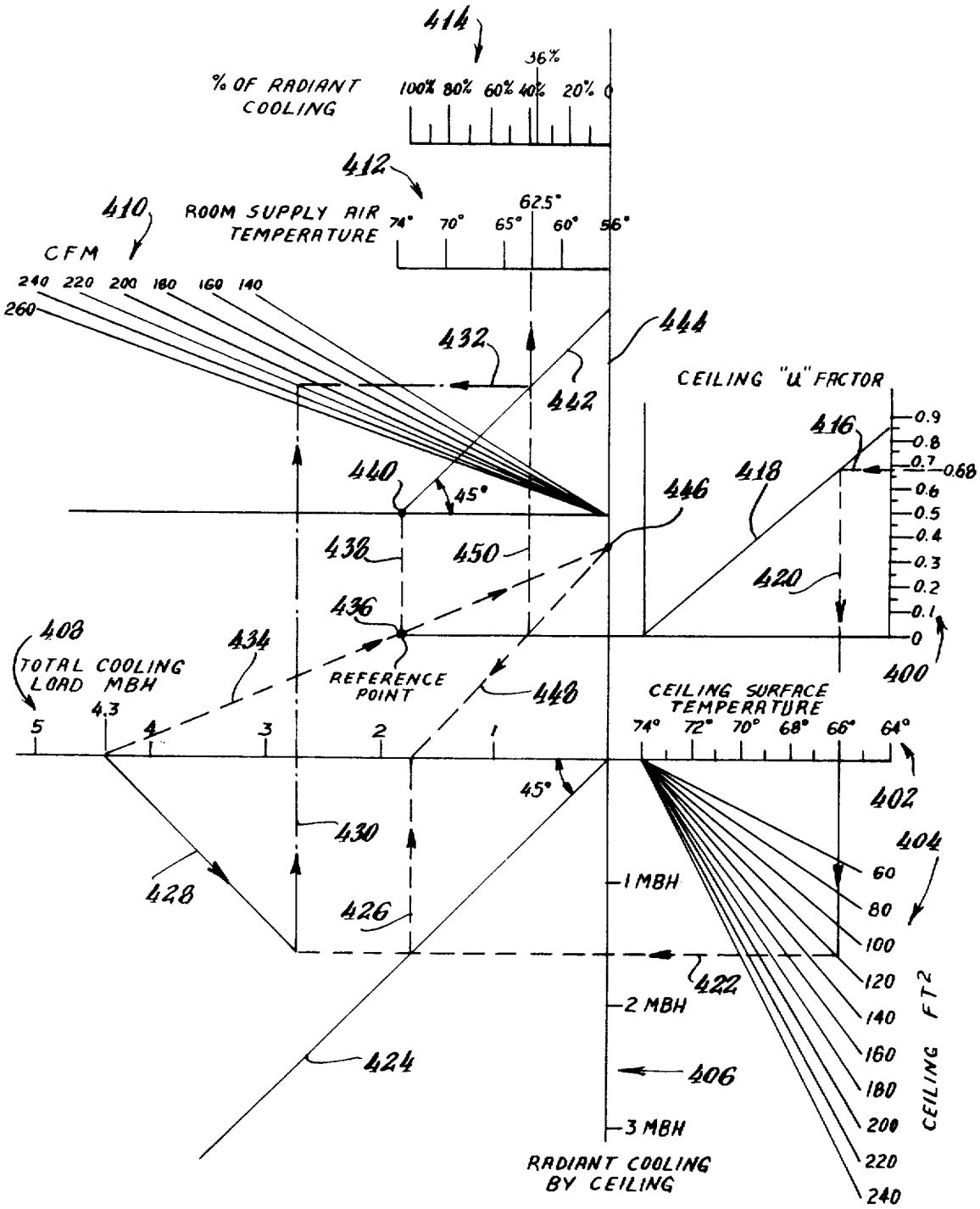
FIG. 22 is a similar nomograph, but relates to cooling performance.

FIG. 22 is a similar nomograph which provides a quantitative analysis of cooling performance, and is read in the same manner. Again taking a specific example, let us suppose that a particular apartment in a building in accordance with this invention has its own individual cooling plant and thermostat, a ceiling area of 120 sq. ft., a ceiling u factor of 0.68, and a total cooling load of 4300 BTU per hour. (For the sake of simplification, the effect of floors and of inside and outside walls is ignored.) The system is designed to maintain an inside temperature of 74° F. when the outside temperature is 95° F. The cooling plant is designed to supply air at an initial temperature of 56° F. When these conditions are applied to the nomograph of FIG. 22, they yield the following answers: the inside ceiling surface temperature is 66° F. The supply air must reach the room interiors at a temperature of 62.5° F. and at a flow rate of 220 cubic feet per minute. The percentage of radiant cooling is 36%, and the balance of 64% is made up by convective cooling.

The nomograph includes a ceiling u factor diagram 400, a ceiling surface temperature scale 402, a ceiling surface diagram area 404, a ceiling radiant cooling load scale 406, a total cooling load scale 408, an air flow rate diagram 410, a room supply air temperature scale 412 and a percentage scale 414 showing the balance between radiative and convective cooling.

In order to work out the specific example given above, the ceiling u factor of 0.68 is set on the scale 400 by means of a horizontal line 416. The intersection of that line with a slanted line 418 gives rise to a vertical line 420 which indicates a required ceiling surface temperature of 66° F. for radiative cooling. Vertical line 420 also can be carried down to its intersection with the 120 sq. ft. line of the ceiling area diagram 404. This gives rise to a horizontal line 422 which can be read against scale 406 to indicate that 1.6 MBH of cooling load is supplied radiantly by the ceiling.

The horizontal line 422 may also be carried to its intersection with a 45° diagonal line 424. This intersection gives rise to a vertical line 426 which further indicates a radiative ceiling cooling load of 1.6 MBH on the scale 408. Further to the left on scale 408, however, the total apartment cooling load of 4.3 MBH is indicated and used as the starting point for a 45° diagonal line 428. Then the intersection of lines 428 and 422 designates the location of a vertical line 430 which crosses the air flow rate diagram 410. The intersection of line 430 with a horizontal line 432 is read against diagram 410 to indicate the air flow rate in cubic feet per minute.

In order to generate the horizontal line 432, a line 434 is drawn from the 4.3 MBH point on scale 408 to its intersection 436 with the base line of the ceiling u factor scale 400. This intersection, reference point 436, gives rise to a vertical line 438 which intersects the base line of diagram 410 at a point 440. Then a 45° diagonal line 442 is drawn from point 440. Looking again at line 434, its intersection with the vertical reference line 444 establishes a reference point 446, from which a line 448 is drawn to the intersection of line 426 and the base line of scale 408. Then the intersection of line 448 and the base line of scale 400 defines the location of a vertical line 450. It is the intersection of lines 450 and 442 which determines the position of horizontal line 432. Then, as previously noted, the intersection of lines 430 and 432 is read against scale 410 to indicate that an air flow rate of 220 cubic feet per minute is required for convective cooling.

The vertical line 450 is also extended to indicate on the scale 412 that the convective air supply must enter the room at a temperature of 62.5° F. Further, line 450 is extended across the scale 414 to indicate that the extent of radiative cooling is 36%, and the balance of convective cooling is 64%.

If this hypocaust type of system is used with a central heating or cooling plant, or if the building is divided into a few thermostat zones, the general rate of radiative heat transport to or from the interior living space is determined by the initial temperature of the heated or cooled air delivered by the central plant, the heat transmissivity or u factor of the module walls, ceilings and floors, the rate of heat exchange which occurs through exterior building surfaces, and, as to each individual apartment, it also depends upon the amount of temperature drop or increase suffered by the heated or cooled air from the time it is supplied by the central plant to the time that it arrives in the vicinity of that particular apartment. Then regulation within the range allowed by the preceding factors is achieved by the building or zone thermostat, which turns the heating plant on and off as a function of temperature at one or more inside locations. Specifically, on a winter day which has an outside temperature of 0° F., a thermostat set for 72° F. might keep the heating plant running on a 100% duty cycle, whereas at 36° F. outside temperature the thermostat would turn the heating plant on and off at a 50% duty cycle, and at 72° F. outside temperature the thermostat would keep the heating plant shut off.

But this relates to regulation of an entire zone, or of the apartment building as a whole. The question then arises as to how individual room apartment temperatures can be regulated by those who might prefer their habitations to be somewhat warmer or cooler than the common thermostat temperature, or by those whose apartments have greater or lesser outside wall exposure, or are at different distances from the heating or cooling plant so that the common air supply enters their rooms at different temperatures. In order to provide a measure of individual control, ceiling diffusers such as 168 in the various rooms are made adjustable, using conventional diffuser hardware of the type that is now employed in many heating and cooling systems. Alternatively, local blowers with individual thermostats may be used to control the air inflow. By adjustment of the controls on the ceiling diffusers or the local blower thermostat, the occupants of the rooms can adjust the rate of hot or cold air flow into the rooms on an individual basis, so that a greater or lesser convective effect is superimposed upon the centrally or zonally controlled radiative effect. The radiative effect then provides a base level of heating or cooling which is not individually controllable, but the occupants of individual rooms, by adjusting the rate of air flow through respective ceiling diffusers, can control the amount of additional local convective heating or cooling which is superimposed upon the radiative effect.

It will now be appreciated that the building of this invention extracts the full measure of construction economies available from the prefabricated room module concept. Here the module is not only a prefabricated enclosure, but it also is part of the structural framework of the building, serving both as a beam and as a tie to connect the columns together in two horizontal directions. In a preferred embodiment of the invention, the inter-module spaces serve as a radiative heating/cooling jacket and as air-delivery chases and plenums, and the modules also serve as convenient pouring forms for the columns, thus doing away with the need for constructing separate wooden forms. Finally, the modules are sealed after construction at the factory, to bar the entry of workmen during the on-site phase of the construction, but are provided with chambers which not only form vertically aligned ducts for field-installation of service risers, but also permit complete interconnection of the modules to the service risers without dirtying the interior living space of the building.

In view of the foregoing description it will be apparent that the invention is not limited to the specific details set forth therein for the purposes of illustration, and that various other modifications are equivalent for the stated and illustrated functions without departing from the spirit and scope of the invention.

We claim:

1. A multi-story building of modular construction including a plurality of modular box beams of substantially similar structural strength, each said beam enclosing at least one room of the interior space of said building, said box beams being in spaced horizontal layers and in spaced vertical alignment, a plurality of vertical columns for supporting the weight of said box beams, said columns being cast-in-situ in laterally and longitudinally spaced apart relation and being positioned between said horizontally spaced box beams adjacent the ends thereof box beam support members on said columns to receive and support the box beams of the story thereabove, said box beams being rigidly bonded to said support members, and said box beams above the ground floor being supported substantially entirely upon said support members and having strength enough to span the space between said support members without support from box beams therebelow, whereby said box beams have substantially their entire weight carried by said vertical columns.

2. A multi-story building as set forth in claim 1 in which said box beams collectively bear at least the major portion of all horizontal structural loads of said building in the direction of the longitudinal axes of said box beams.

3. A multi-modular building adapted for ready on-site construction through use of pre-fabricated modules of uniform strength, said building including:

a base support, a plurality of layers of box beam room modules, each of said layers including a plurality of said room modules in spaced horizontal relationship, said layers being positioned one above another with said room modules in spaced vertical alignment, a series of vertical concrete supporting columns fabricated of material in a portion of the space between said horizontally disposed modules, said columns being spaced apart laterally and longitudinally of said modules and positioned near the ends thereof, said supporting columns carrying module supporting shoulders for said layers of modules above said base, said cast-in-situ supporting shoulders and columns bearing the weight of the respective modules positioned thereabove and rigidly binding horizontally adjacent modules together, said room modules having sufficient structural strength to be self-supporting between said shoulders, whereby a building is constructed of substantially uniform room modules which do not themselves support the weight of the modules thereabove.

4. A building as in claim 3 wherein:

said box beams have side walls reinforced with a plurality of exterior vertical ribs, at least some of said ribs of confronting box beam walls engaging with said cast in situ columns to provide structural rigidity.

5. A building as in claim 3 wherein:

the width of said columns decreases with increasing height of said building.

6. A building as in claim 3 wherein:

said box beams comprise side plates formed with a downwardly increasing thickness, and the confronting outer surfaces of said side plates of horizontally consecutive box beams converge toward each other in the downward direction, whereby said columns cast-in-situ therebetween taper downwardly to a smaller thickness at the lower portion of each story than at the upper portion thereof.

7. A building as in claim 3 wherein:

horizonal outrigger beams are embedded in said poured columns and project beyond said box beams, and an external gallery is supported upon said outrigger beams.

8. A building as in claim 3 wherein:

said box beams have side walls reinforced with exterior vertical ribs, and said cast in situ column material interlocks said box beams and columns against mutual displacement along the longitudinal axis of said box beams.

9. A building as in claim 1 wherein:

said room-enclosing box beams also extend between two of said columns in a second horizontal direction transverse to the longitudinal axis of said box beams, and are secured thereto and effective to act as horizontal ties between said columns for lending horizontal rigidity to said framework along said second horizontal direction;

and said room-enclosing box beams collectively also bear at least the major portion of all structural loads exerted by said building in said second horizontal direction.

10. A building as in claim 9 wherein said structural framework includes no other horizontal structural members apart from said room-enclosing boxes which are capable by themselves of bearing the horizontal structural loads exerted by said building.

11. A building as in claim 10 wherein said structural framework consists exclusively of said columns and said room-enclosing boxes.

References Cited

The following references, cited by the Examiner, are of record in the patented file of this patent or the original patent.

UNITED STATES PATENTS

| | | | |
|---|---|---|---|
| 961,210 | 6/1910 | Conzelman | 52—283 |
| 1,293,377 | 2/1914 | Donaldson | 52—283 |
| 3,331,170 | 7/1967 | Lowe et al. | 52—79 |
| 3,416,273 | 12/1968 | Stuckey et al. | 52—79 |
| 3,507,080 | 4/1970 | Van Hezik | 52—79 |
| 3,514,910 | 6/1970 | Comm | 52—79 |
| 3,613,321 | 10/1971 | Rohrer | 52—79 |

FOREIGN PATENTS

| | | | |
|---|---|---|---|
| 641,899 | 6/1964 | Belgium | 52—79 |
| 48,027 | 5/1966 | East Germany | 52—73 |
| 55,715 | 5/1952 | France | 52—73 |
| 1,316,985 | 12/1962 | France | 52—236 |
| 1,509,042 | 12/1967 | France | 52—79 |
| 1,518,637 | 2/1968 | France | 52—79 |

HENRY C. SUTHERLAND, Primary Examiner

U.S. Cl. X.R.

52—236